(12) United States Patent
Hata et al.

(10) Patent No.: US 10,059,185 B2
(45) Date of Patent: Aug. 28, 2018

(54) CONTROL SYSTEM FOR HYBRID VEHICLE

(71) Applicant: Toyota Jidosha Kabushiki Kaisha, Toyota-shi (JP)

(72) Inventors: Kensei Hata, Sunto-gun (JP); Hideaki Komada, Gotemba (JP); Tatsuya Imamura, Okazaki (JP); Takahito Endo, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/844,818

(22) Filed: Dec. 18, 2017

(65) Prior Publication Data

US 2018/0178642 A1 Jun. 28, 2018

(30) Foreign Application Priority Data

Dec. 27, 2016 (JP) .................................. 2016-252983

(51) Int. Cl.
| | |
|---|---|
| *B60W 20/40* | (2016.01) |
| *B60K 6/365* | (2007.10) |
| *F16H 3/72* | (2006.01) |
| *B60W 30/18* | (2012.01) |

(52) U.S. Cl.
CPC ............. *B60K 6/365* (2013.01); *B60W 20/40* (2013.01); *B60W 30/18036* (2013.01); *F16H 3/728* (2013.01); *F16H 2200/201* (2013.01)

(58) Field of Classification Search
CPC ...... B60W 20/00; B60W 20/40; B60W 10/00; B60W 20/10; B60W 20/19; B60W 20/20
See application file for complete search history.

(56) References Cited

U.S. PATENT DOCUMENTS

| | | | |
|---|---|---|---|
| 8,444,518 B2* | 5/2013 | Tanae ..................... | H02K 7/116 475/5 |
| 8,512,189 B2 | 8/2013 | Holmes et al. | |
| 8,784,845 B2* | 7/2014 | Bruce .................... | A61K 33/24 424/400 |
| 2006/0011395 A1 | 1/2006 | Sugiyama et al. | |
| 2008/0302590 A1* | 12/2008 | Sato ......................... | B60K 6/52 180/242 |

FOREIGN PATENT DOCUMENTS

JP 4069901 4/2008

* cited by examiner

*Primary Examiner* — John Daniel Walters
*Assistant Examiner* — James J Triggs
(74) *Attorney, Agent, or Firm* — Oblon, McClelland, Maier & Neustadt, L.L.P.

(57) ABSTRACT

A control system for hybrid vehicles is provided to prevent reduction in drive force when propelling the vehicle backwardly while activating the engine. In the differential mechanism, a first rotary element is connected to an engine, a second rotary element is connected to a first motor, a third rotary element is connected to a second motor, and a fourth rotary element is connected to an output unit. A third motor is connected to the output unit. When propelling the vehicle backwardly while activating the engine, first motor and the second motor establish reaction torques against engine torque, and the third motor generates drive torque to propel the hybrid vehicle in the reverse direction.

7 Claims, 18 Drawing Sheets

CONTROL SYSTEM FOR HYBRID VEHICLE

CROSS REFERENCE TO RELATED APPLICATIONS

The present disclosure claims the benefit of Japanese Patent Application No. 2016-252983 filed on Dec. 27, 2016 with the Japanese Patent Office, the disclosure of which are incorporated herein by reference in its entirety.

BACKGROUND

Field of the Disclosure

Embodiments of the present disclosure relate to the art of a control system for a hybrid vehicle in which a prime mover includes an engine and at least three motors.

Discussion of the Related Art

US2006/011395 A1 describes a hybrid vehicle in which a prime mover includes an engine and three motor-generators. The hybrid vehicle taught by US2006/011395 A1 comprises a power split device including two sets of planetary gear mechanisms. The power split device thus structured preforms a differential action among four rotary elements. In the power split device, a first rotary element is connected to engine, a second rotary element is connected to a first motor, a third rotary element is connected to a second motor, and a fourth rotary element is connected to drive wheels through a differential unit connected to a third motor. According to the teachings of US2006/011395 A1, a speed ratio between the first rotary element and the fourth rotary element may be varied continuously by manipulating the first motor and the second motor. In the hybrid vehicle taught by US2006/011395 A1, any one of the motors whose expected output is smaller than that of the other one is used to establish a reaction force against an engine torque, and resultant electricity is supplied to the third motor.

U.S. Pat. No. 8,512,189 also describes a hybrid vehicle comprising an engine and three motors. According to the teachings of U.S. Pat. No. 8,512,189, an operating mode of the hybrid vehicle may be selected from a compound-split mode, an input-split mode, a launch mode, and an all-wheel drive mode, and the engine is operated in those operating modes. In the compound-split mode, one of the first motor and the second motor serves as a generator to rotate the first drive axle, and the other motor serves as a prime mover. In the input-split mode, one of the first motor and the second motor serves as a generator, and the third motor serves as a prime mover to drive a second drive axle. In the launch mode, one of the first motor and the second motor serves as a generator, the other motor functions as a prime mover to generate torque to prevent the first drive axle from being rotated by an engine torque, and the third motor is operated as a motor by the electricity generated by the motor serving as a generator to launch the hybrid vehicle. In the all-wheel drive mode, one of the first motor and the second motor serves as a generator, and the other motor and the third motor individually serve as a prime mover to rotate the first drive axle and the second drive axle respectively.

According to the teachings of the foregoing prior art documents, given that a state of charge level (i.e., an SOC level) of battery is sufficiently high, the hybrid vehicle is propelled in the reverse direction only by the motor connected to an output unit. By contrast, given that the SOC level of battery is insufficient, the hybrid vehicle is propelled in the reverse direction by the engine while operating the motor connected to a power split device as a generator. The resultant electricity is supplied to the motor connected to the output unit to power the hybrid vehicle. In those cases, an output toque of the motor propelling the hybrid vehicle in the reverse direction is also used as a reaction torque against the engine. In this situation, therefore, drive force for propelling the vehicle in the reverse direction may be reduced.

Thus, US2006/011395 A1 discloses techniques of downsizing of the motor and avoiding occurrence of power circulation. On the other hand, U.S. Pat. No. 8,512,189 discloses techniques of selecting the operating mode in such a manner as to improve fuel efficiency. However, the conventional hybrid vehicles have to be improved to be propelled in the reverse direction by the engine without causing a reduction in the drive force.

SUMMARY

Aspects of embodiments of the present disclosure have been conceived noting the foregoing technical problems, and it is therefore an object of the present disclosure is to provide a control system that is applied to a hybrid vehicle including an engine and at least three motors to prevent a reduction in drive force during reverse propulsion while activating the engine.

The control system according to the embodiments of the present disclosure relates to a control system for a hybrid vehicle, comprising: a prime mover including an engine and at least three motors; a differential mechanism that performs a differential rotation among at least four rotary elements; an output unit that delivers power to drive wheels; and a controller that controls the prime mover. In the hybrid vehicle, the engine is connected to a first rotary element of the differential mechanism, a first motor of the prime mover is connected to a second rotary element of the differential mechanism, a second motor of the prime mover is connected to a third rotary element of the differential mechanism, the output unit is connected to a fourth rotary element of the differential mechanism, and a third motor of the prime mover is connected to the output unit that is connected to the fourth rotary element or another output unit that is not connected to the fourth rotary element. In order to achieve the above-mentioned objective, the controller is configured to: determine a running condition of the hybrid vehicle; and control the first motor and the second motor in such a manner as to establish reaction torques against torque of the engine, and control the third motor to generate drive torque to propel the hybrid vehicle in a reverse direction, when the engine is required to be activated to generate the drive torque to propel the hybrid vehicle during propulsion in the reverse direction.

In a non-limiting embodiment, the controller may be further configured to switch a control mode based on at least any one of a vehicle speed and a required drive force during reverse propulsion, between: a first control mode in which both of the first motor and the second motor are operated to establish the reaction torques against the engine torque, and the third motor is operated to generate the drive torque; and a second control mode in which any one of the first motor and the second motor is operated to establish the reaction torque against the engine torque, and the third motor is operated to generate the drive torque.

In a non-limiting embodiment, the controller may be further configured to: compare the vehicle speed during reverse propulsion with a threshold speed; select the first control mode when the vehicle speed is lower than the threshold speed; and select the second control mode when the vehicle speed is higher than the threshold speed.

In a non-limiting embodiment, the controller may be further configured to: compare the required drive force during reverse propulsion with a threshold value; select the first control mode when the required drive force is larger than the threshold value; and select the second control mode when the required drive force is smaller than the threshold value.

In a non-limiting embodiment, the controller may be further configured to: compare the vehicle speed during reverse propulsion with a threshold speed; compare the required drive force during reverse propulsion with a threshold value; select the first control mode when the vehicle speed is lower than the threshold speed, and the required drive force is larger than the threshold value; and select the second control mode when the vehicle speed is higher than the threshold speed, or the required drive force is smaller than the threshold value.

In a non-limiting embodiment, the differential mechanism may include: a first planetary gear unit including a first sun gear, a first carrier, and a first ring gear; and a second planetary gear unit including a second sun gear, a second carrier, and a second ring gear. In the differential mechanism, the first sun gear and the second sun gear may be connected to each other, the first ring gear and the second carrier may be connected to each other, the first carrier may be connected to the engine to serve as the first rotary element, the first sun gear or the second sun gear may be connected to the first motor to serve as the second rotary element, the second ring gear may be connected to the second motor to serve as the third rotary element, and the first ring gear or the second carrier may be connected to the output unit to serve as the fourth rotary element.

In a non-limiting embodiment, the differential mechanism may include: a first planetary gear unit including a first sun gear, a first carrier, and a first ring gear; and a second planetary gear unit including a second sun gear, a second carrier, and a second ring gear. In the differential mechanism, the first carrier and the second ring gear may be connected to each other, the first ring gear and the second carrier may be connected to each other, the first ring gear or the second carrier may be connected to the engine to serve as the first rotary element, the second sun gear may be connected to the first motor to serve as the second rotary element, the first sun gear may be connected to the second motor to serve as the third rotary element, and the first carrier or the second ring gear may be connected to the output unit to serve as the fourth rotary element.

Thus, according to the embodiment of the present disclosure, any one of the first motor and the second motor may be operated as a generator when propelling the vehicle in the reverse direction while activating the engine. In this situation, the reaction torque against the engine torque may be established by both of the first motor and the second motor connected to the differential mechanism. According to the embodiment of the present disclosure, therefore, the third motor connected to the drive wheels through the output unit is allowed to generate the drive torque without establishing the reaction torque against the engine torque. For this reason, undesirable reduction in the drive force resulting from establishing the reaction torque against the engine torque may be prevented when propelling the vehicle while activating the engine.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present disclosure will now be explained with reference to the accompanying drawings.

Figure 1:
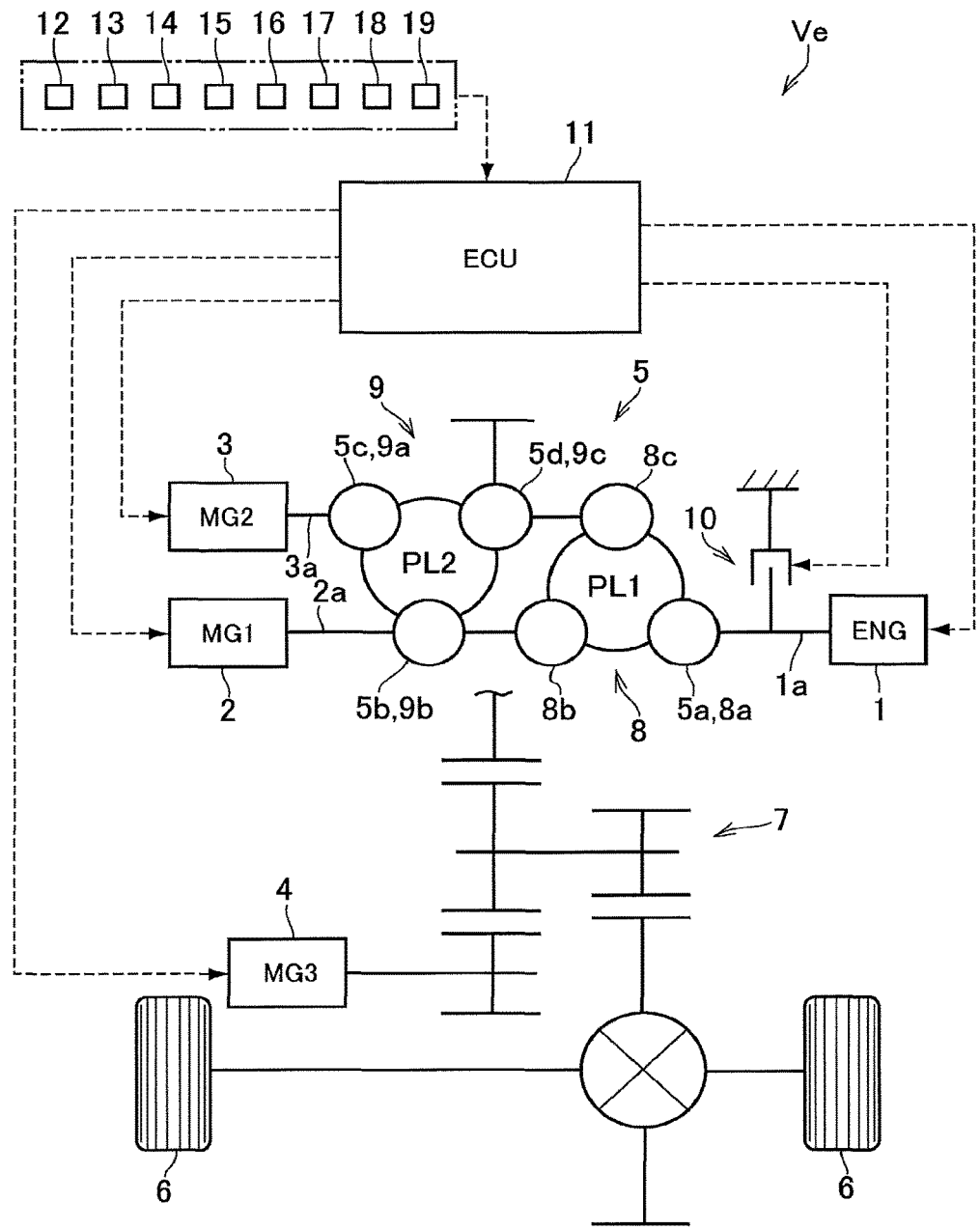
FIG. 1 is a schematic illustration showing an example of a drive system of the hybrid vehicle to which the control system according to the embodiment is applied.

Referring now to FIG. 1, there is schematically shown an example of a structure of a hybrid vehicle (as will be simply called the "vehicle" hereinafter) Ve to which the control system according to the embodiment is applied. The vehicle Ve comprises a differential mechanism adapted to perform a differential action among four rotary elements, and an output unit to deliver power to any of a pair of front wheels and a pair of rear wheels.

As shown in FIG. 1, a prime mover of the vehicle Ve includes an engine (referred to as "ENG" in FIG. 1) 1, a first motor (referred to as "MG1" in FIG. 1) 2, a second motor (referred to as "MG2" in FIG. 1) 3, and a third motor (referred to as "MG3" in FIG. 1) 4. The vehicle Ve further comprises a differential mechanism 5 serving as a power split device, and an output unit 7 that delivers power to drive wheels 6.

For example, an internal combustion engine such as a gasoline engine and a diesel engine may be used as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled electrically.

A permanent magnet type synchronous motor or an induction motor having a generating function, that is, a motor-generator may be used individually as the first motor 2, the second motor 3, and the third motor 4. The first motor 2, the second motor 3, and the third motor 4 are individually connected to a power source controller (not shown) including a battery and an inverter so that rotational speeds and torques thereof are controlled electrically. In addition, the first motor 2, the second motor 3, and the third motor 4 may also be operated by the selectively as a motor and a generator. In the vehicle Ve shown in FIG. 1, therefore, an electric power generated by the first motor 2 or the second motor 3 can be supplied to the third motor 4 to operate the third motor 4 as a motor.

The differential mechanism 5 is adapted to perform a differential action among a first rotary element 5a, a second rotary element 5b, a third rotary element 5c and a fourth rotary element 5d. Specifically, the first rotary element 5a is connected to the engine 1, the second rotary element 5b is connected to the first motor 2, the third rotary element 5c is connected to the second motor 3, and the fourth rotary element 5d is connected to the output unit 7.

The differential mechanism 5 includes a first planetary gear unit (referred to as "PL1" in FIG. 1) 8, and a second planetary gear unit (referred to as "PL2" in FIG. 1) 9. The first planetary gear unit 8 includes a first input element 8a, a first reaction element 8b and a first output element 8c. Likewise, the second planetary gear unit 9 includes a second input element 9a, a second reaction element 9b and a second output element 9c. The first reaction element 8b and the second reaction element 9b are connected to each other, and the first output element 8c and the second output element 9c are connected to each other.

In the differential mechanism 5, an output shaft 1a of the engine 1 is connected to the first input element 8a, an output shaft 2a of the first motor 2 is connected to the first reaction element 8b and the second reaction element 9b, and an output shaft 3a of the second motor 3 is connected to the second input element 9a. The output unit 7 is connected to the first output element 8c and the second output element 9c, and also connected to the drive wheels 6 to deliver power to the drive wheels 6.

That is, in the differential mechanism 5, the first element 8a connected to the engine 1 serves as the first rotary element 5a, the first reaction element 8b and the second reaction element 9b connected to the first motor 2 serve as the second rotary element 5b, the second input element 9a connected to the second motor 3 serves as the third rotary element 5c, and the first output element 8c and the second output element 9c connected to the output unit 7 serve as the fourth rotary element 5d.

Thus, the vehicle Ve according to the embodiment of the present disclosure is provided with the "output unit" to deliver power to the drive wheels 6. Specifically, given that any one of the pairs of the front wheels and the rear wheels serve as the drive wheels, the output unit is arranged to deliver power to said one of the pairs of the front wheels and the rear wheels serving as the drive wheels. By contrast, given that both pairs of the front wheels and the rear wheels serve as the drive wheels, two output units are arranged to deliver power to each of the pairs of the front wheels and the rear wheels. In the example shown in FIG. 1, the output unit 7 is interposed between the fourth rotary element 5d of the differential mechanism 5 and the front wheels serving as the drive wheels 6.

The third motor 4 is also connected to the output unit 7. In the vehicle shown in FIG. 1, therefore, the drive wheels 6 can be rotated not only by torque delivered from the fourth rotary element 5d of the differential mechanism 5 to the output unit 7, but also by torque delivered from the third motor 4 to the output unit 7.

A rotation of the output shaft 1a of the engine 1 connected to the first input element 8a may be stopped selectively by a brake 10. In the vehicle Ve, the first input element 8a is allowed to serve as a reaction element of the first planetary gear unit 8 to deliver output torque of the first motor 2 to the output unit 7 by applying the brake 10. In this case, the vehicle Ve may be propelled while stopping the engine 1, by torque of one of the first motor 2 and the second motor 3 and torque of the third motor 4, or by torques of the first motor 2, the second motor 3, and the third motor 4.

In order to control the engine 1, the first motor 2, the second motor 3 and the third motor 4, the vehicle Ve is further provided with a controller (referred to as "ECU" in FIG. 1) 11 composed mainly of a microcomputer.

For example, the controller 11 receives detection signals from a vehicle speed sensor 12 that detects a speed of the vehicle Ve, an accelerator sensor 13 that detects a position or a speed of depressing an accelerator pedal, an engine speed sensor 14 that detects a speed of the engine 1, a first motor speed sensor (or a resolver) 15 that detects a speed of the first motor 2, a second motor speed sensor (or a resolver) 16 that detects a speed of the second motor 3, a third motor speed sensor (or a resolver) 17 that detects a speed of the third motor 4, a battery sensor 18 that detects a state of charge (to be abbreviated as "SOC" hereinafter) level of the battery, and a shift position sensor 19 that detects a position of a shift lever or a shift switch. The controller 11 is configured to carry out a calculation based on incident data and data and formulas installed in advance, and to transmit calculation results in the form of command signals to the components of the vehicle Ve.

Figure 2:
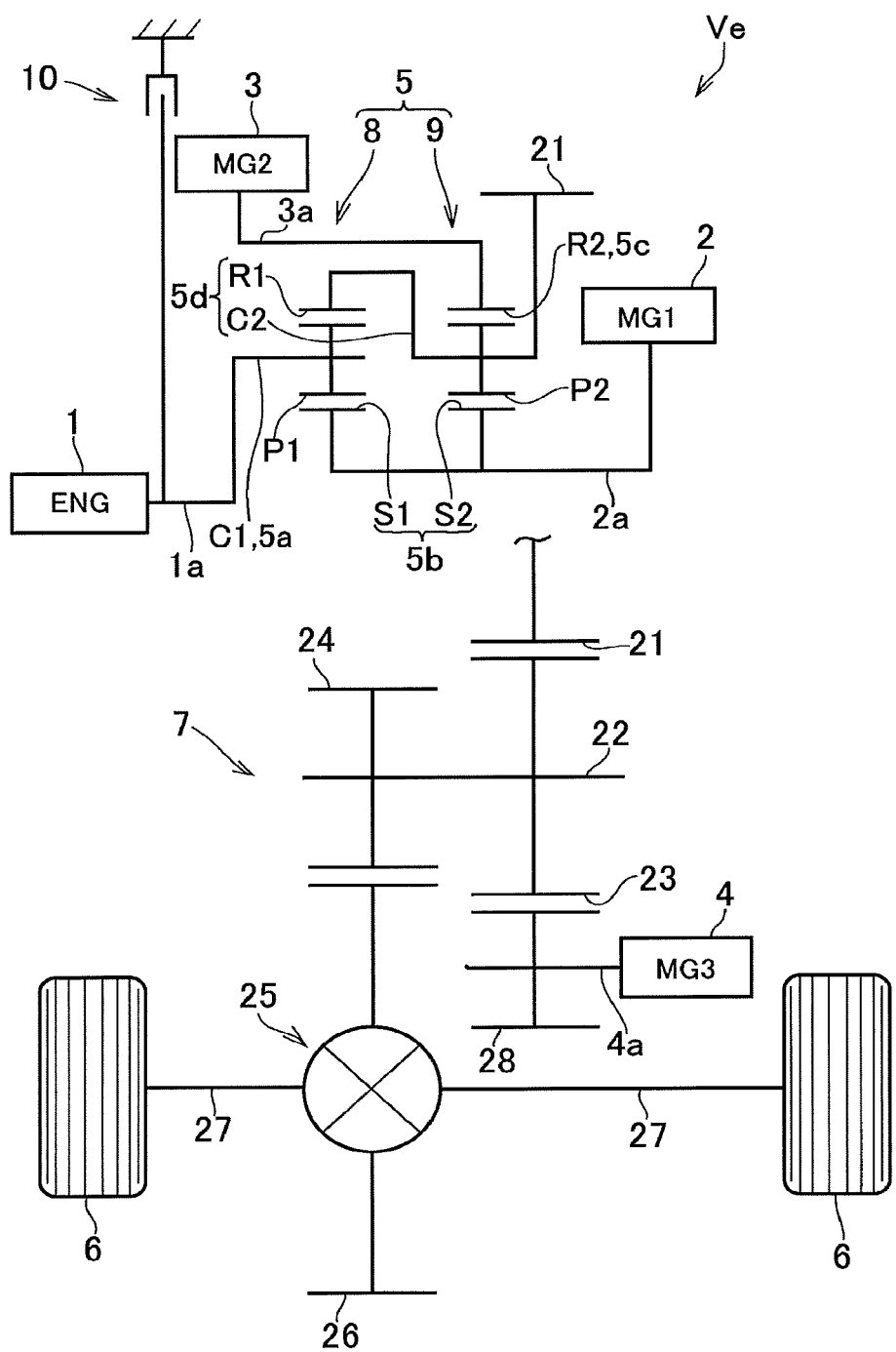
FIG. 2 is a schematic illustration showing a first example of a gear train of the hybrid vehicle.

Turning to FIG. 2, there is shown a first example of a gear train of the vehicle Ve. The gear train shown in FIG. 2 is adapted to be used as a transaxle in FF (front-engine/front-wheel drive) layout vehicles, RR (rear engine/rear wheel drive) layout vehicles, and MR (mid-engine/rear drive) layout vehicles.

In the gear train shown in FIG. 2, the first planetary gear unit 8 and the second planetary gear unit 9 are arranged coaxially with the output shaft 1a of the engine 1, and the rotary elements of the first planetary gear unit 8 and the rotary elements of the second planetary gear unit 9 are connected to each other to form the differential mechanism 5 as a complex planetary gear unit. The first planetary gear unit 8 is a single-pinion planetary gear unit including a first sun gear S1, a first ring gear R1, and a first carrier C1. In the first planetary gear unit 8, specifically, the first sun gear S1 as an external gear is arranged coaxially with the output shaft 1a of the engine 1, the first ring gear R1 as an internal gear is arranged coaxially around the first sun gear S1, and the first carrier C1 supports a plurality of first pinion gears P1 interposed between the first sun gear S1 and the first ring gear R1 in a rotatable manner.

The second planetary gear unit 9 is also a single-pinion planetary gear unit including a second sun gear S2, a second ring gear R2, and a second carrier C2. In the second planetary gear unit 9, specifically, the second sun gear S2 as an external gear is arranged coaxially with the output shaft 1a of the engine 1, the second ring gear R2 as an internal gear is arranged coaxially around the second sun gear S2, and the second carrier C2 supports a plurality of second pinion gears P2 interposed between the second sun gear S2 and the second ring gear R2 in a rotatable manner.

In the differential mechanism 5, the first carrier C1 is connected to the output shaft 1a of the engine 1, the sun gear S1 and the second sun gear S2 are connected to the output shaft 2a of the first motor 2, the second ring gear R2 is connected to an output shaft 3a of the second motor 3, and the first ring gear R1 and the second carrier C2 are connected to the output unit 7. According to the first example shown in FIG. 2, the output unit 7 includes a drive gear 21, a countershaft 22, a counter driven gear 23, a final drive gear 24, and a differential gear unit 25, and an output torque of the output unit 7 is delivered to the drive wheels 6 through each driveshaft 27.

In the first planetary gear unit 8, accordingly, the first carrier C1 serves as the first input element 8a, the first sun gear S1 serves as the first reaction element 8b, and the first ring gear R1 serves as the first output element 8c. On the other hand, in the second planetary gear unit 9, the second ring gear R2 serves as the second input element 9a, the second sun gear S2 serves as the second reaction element 9b, and the second carrier C2 serves as the second output element 9c. Accordingly, in the differential mechanism 5, the first carrier C1 serves as the first rotary element 5a, the first sun gear S1 and the second sun gear S2 serve as the second rotary element 5b, the second ring gear R2 serves as the third rotary element 5c, and the first ring gear R1 and the second carrier C2 serve as the fourth rotary element 5d.

Optionally, a gear unit may be interposed between the first carrier C1 of the first planetary gear unit 8 and the output shaft 1a of the engine 1. Instead, a damper device or a torque converter (neither of which are shown) may also be interposed between the first carrier C1 of the first planetary gear unit 8 and the output shaft 1a of the engine 1.

The drive gear 21 is formed around the second carrier C2 to be rotated integrally therewith, and a countershaft 22 is arranged in parallel with the output shaft 1a of the engine 1. A counter driven gear 23 is fitted onto one of end portions of the countershaft 22 (i.e., in the right side in FIG. 2) while being meshed with the drive gear 21, and a final drive gear 24 is fitted onto the other end portion of the countershaft 22 (i.e., in the left side in FIG. 2) while being meshed with a final driven gear (i.e., a differential ring gear) 26 of a differential gear unit 25 as a final reduction. The differential gear unit 25 is connected to each of the drive wheels 6 through each of the driveshafts 27.

Thus, the drive gear 21, the countershaft 22, the counter driven gear 23, the final drive gear 24, and the differential gear unit 25 form the output unit 7, and torque delivered to the output unit 7 from the second carrier C2 is further delivered to the drive wheels 6 through the driveshafts 27.

Torque of the third motor 4 may be added to torque transmitted from the differential mechanism 5 to the drive wheels 6. To this end, an output shaft 4a of the third motor 4 is arranged parallel to the countershaft 22, and a pinion 28 is fitted onto a leading end (i.e., in the left side in FIG. 2) of the output shaft 4a while being meshed with the counter driven gear 23. Thus, not only the second carrier C2 but also the third motor 4 are connected to the drive wheels 6 through the output unit 7.

A rotation of the first carrier C1 connected to the output shaft 1a of the engine 1 is selectively stopped by a brake 10. Specifically, the brake 10 is engaged to apply a reaction force to the first carrier C1 when the first motor 2 is operated as a motor while stopping the engine 1 to generate the drive force. In this situation, the reaction force resulting from rotating the first motor 2 in a counter direction (opposite to a rotational direction of the engine 1) by supplying electricity thereto is received by a predetermined stationary member such as a casing to which the brake 10 is fixed. Consequently, the vehicle Ve is powered by the first motor 2 while stopping the engine 1. Instead, the vehicle Ve may also be powered by the first motor 2 and the second motor 3, or by the first motor 2, the second motor 3, and the third motor 4.

For example, a friction clutch such as a wet-type multiple disc clutch, and a dog clutch may be used as the brake 10. In addition, a one-way clutch may also be used as the brake 10 to stop the counter rotation of the carrier first C1.

Thus, in the vehicle Ve, a speed of the engine 1 may be changed by controlling the first motor 2, the second motor 3, and the third motor 4 by the ECU 11 without manipulating the clutch and the brake. In addition, an operating mode of the vehicle Ve may also be shifted among a plurality of modes without manipulating the clutch and the brake.

In the vehicle Ve shown in FIG. 2, a motor mode in which the engine 1 is stopped may be selected from a first motor mode in which the vehicle Ve is powered at least by the third motor 4, a second motor mode in which the vehicle Ve is powered by the first motor 2 and the third motor 4, a third motor mode in which the vehicle Ve is powered by the second motor 3 and the third motor 4, and a fourth motor mode in which the vehicle Ve is powered by the first motor 2, the second motor 3, and the third motor 4.

On the other hand, in a hybrid mode, the vehicle Ve is powered at least by the engine 1. For example, in the hybrid mode, the vehicle Ve may be propelled in an overdrive mode in which a speed of the fourth rotary element 5d connected to the output unit 7 is increased higher than a speed of the first rotary element 5a connected to the engine 1 by the torques of the engine 1, the first motor 2, and the third motor 4. In the hybrid mode, the vehicle Ve may also be propelled in an underdrive mode in which the speed of the fourth rotary element 5d is reduced lower than the speed of the first rotary element 5a by the torques of the engine 1, the second motor 3, and the third motor 4. In addition, in the hybrid mode, a speed of the engine 1 may be changed arbitrarily by the torques of the engine 1, the first motor 2, and the second motor 3.

The vehicle Ve may be propelled in the reverse direction with or without stopping the engine 1. For example, if the SOC level of the battery is sufficiently high when propelling the vehicle Ve in the reverse direction, a reverse-motor mode is selected to propel the vehicle Ve in the reverse direction while stopping the engine 1. Specifically, the reverse-motor mode may be selected from a first reverse-motor mode in which the vehicle Ve is powered at least by the third motor 4, a second reverse-motor mode in which the vehicle Ve is powered by the first motor 2 and the third motor 4, a third reverse-motor mode in which the vehicle Ve is powered by the second motor 3 and the third motor 4, and a fourth reverse-motor mode in which the vehicle Ve is powered by the first motor 2, the second motor 3, and the third motor 4.

By contrast, if the SOC level of the battery is low when propelling the vehicle Ve in the reverse direction, a reverse-hybrid mode is selected to propel the vehicle Ve in the reverse direction while activating the engine 1. In the reverse-hybrid mode, the first motor 2 or the second motor 3 connected to the differential mechanism 5 may be operated as a generator by torque of the engine 1. For example, electricity generated by the first motor 2 may be supplied to the third motor 4 thereby operating the third motor 4 as a motor to propel the vehicle Ve in the reverse direction.

However, in the conventional hybrid vehicle having an engine, motors, and a planetary gear unit, reaction torque of the motor against engine torque will act in the direction to brake the vehicle. That is, drive torque will be reduced by the motor torque. If the SOC level of the battery is low when propelling the conventional hybrid vehicle in the reverse direction, the motor connected to the power split device is operated as a generator by the engine, and another motor connected to the output unit is operated as a motor to generate drive torque by the electricity generated by the motor operated as a generator. In this situation, since the rotational direction of the engine is limited to one direction, the motor operated as a motor is rotated in the opposite direction to the rotational direction of the engine to propel the vehicle backwardly.

Figure 3:
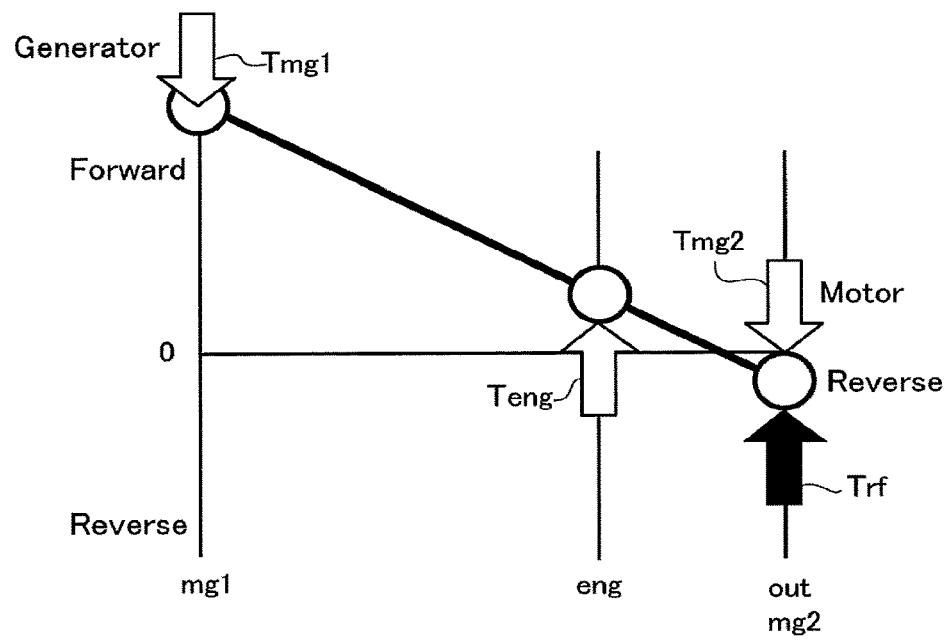
FIG. 3 is a nomographic diagram showing conditions of the engine and motors when propelling a conventional hybrid vehicle in the reverse direction by the engine.

Such situation is shown in FIG. 3. As indicated in FIG. 3, the direction of the torque $T_{mg1}$ of the first motor (referred to as "mg1" in FIG. 3) connected to the power split device, and the direction of the torque $T_{mg2}$ of the second motor (referred to as "mg2" in FIG. 3) connected to the drive wheels through the output unit (referred to as "out" in FIG. 3) are opposite to the direction of the torque $T_{eng}$ of the engine (referred to as "eng" in FIG. 3). Thus, in the situation shown in FIG. 3, the first motor and the second motor establish reaction force against the engine. In FIG. 3, the arrow $T_{rf}$ represents reaction force applied to the vehicle from a road surface.

In this situation, as indicated in FIG. 3, the first motor is rotated in the forward direction as the rotational direction of the engine 1 while establishing negative torque so that the first motor serves as a generator. On the other hand, the second motor is rotated in the counter direction while establishing negative torque. That is, the second motor serves as a motor to propel the vehicle in the reverse direction.

Thus, when propelling the conventional hybrid vehicle in the reverse direction, the first motor connected to the power split device and the second motor connected to the drive wheels through the output unit establish reaction force against the engine torque. In this situation, the second motor connected to the drive wheels through the output unit generates not only drive torque but also reaction torque. Consequently, not only the drive torque to propel the vehicle in the reverse direction but also the brake torque to brake the vehicle is applied to the drive wheels. For this reason, the drive force to propel the vehicle in the reverse direction may be reduced in comparison with that of the case in which the vehicle is propelled in the reverse direction only by the motor. In addition, since the drive force for propelling the vehicle in the reverse direction is changed depending on the operating mode, the drive may sense such difference in the drive force.

In order to avoid such disadvantages when propelling the vehicle Ve in the reverse direction in the reverse-hybrid mode, the controller 11 operates the third motor 4 connected to the output unit 7 in such a manner as to generate drive torque to propel the vehicle Ve in the reverse direction, while operating the first motor 2 and the second motor 3 to establish reaction torque against the engine torque.

Figure 4:
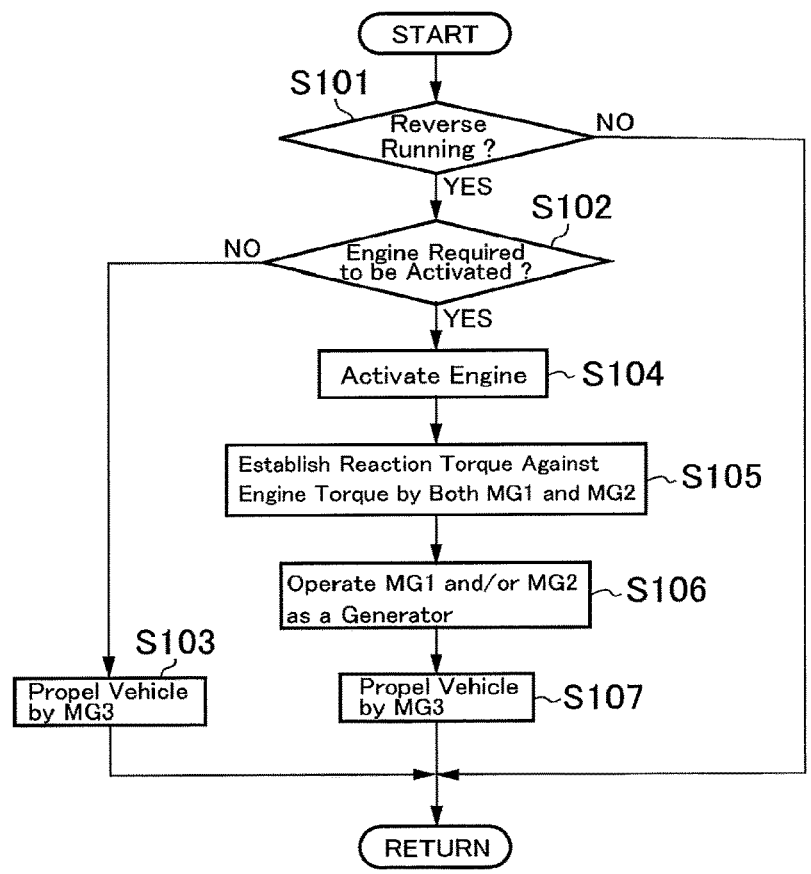
FIG. 4 is a flowchart showing an example of a routine executed by the control system.

To this end, the controller 11 is configured to execute the following routine shown in FIG. 4.

At step S101, it is determined whether or not the vehicle Ve is currently propelled in the reverse direction. For example, the controller 11 determines that the vehicle is propelled in the reverse direction based on a detection signal sent from the shift position sensor 19 representing a fact that a shift lever is situated in a reverse (R) position.

If the vehicle Ve is not propelled in the reverse direction so that the answer of step S101 is NO, the routine returns without carrying out the subsequent controls.

By contrast, if the vehicle Ve is propelled in the reverse direction so that the answer of step S101 is YES, the routine progresses to step S102 to determine whether or not the engine 1 is required to be activated to generate torque to propel the vehicle in the reverse direction. As described, if the SOC level of the battery is low when propelling the vehicle Ve in the reverse direction, the engine 1 is activated to operate one of the first motor 2 and the second motor 3 as a generator by the torque of the engine 1. At step S102, therefore, the controller 11 determines that the engine 1 is required to be activated if the SOC level of the battery detected by the battery sensor 18 is lower than a threshold level. In addition, the controller 11 also determines that the engine 1 is required to be activated if a large drive force is required to propel the vehicle in the reverse direction. For example, the controller 11 also determines that the engine 1 is required to be activated if a depression of the accelerator pedal is deeper than a predetermined value, or a speed of depressing an accelerator pedal is faster than a predetermined value.

Further, the engine 1 is also activated when a voltage of the battery drops, output of the battery is lower than a predetermined value, an external temperature is extremely low, a temperature of coolant for the engine 1 is lower than a predetermined level, the engine 1 or a catalyst has to be warmed up, a drive load of auxiliaries such as an air conditioner is high, and an output power of the motor is restricted due to temperature rise.

If the engine 1 is not required to be activated so that the answer of step S102 is NO, the routine progresses to step S103 to propel the vehicle Ve by the drive torque generated by the third motor 4. In this case, specifically, the third motor 4 is controlled in such a manner as to propel the vehicle Ve backwardly in the reverse-motor mode. As described, in the reverse-motor mode, the vehicle Ve may also be propelled in the reverse direction by at least any one of the first motor 2, the second motor 3, and the third motor 4 depending on the SOC level of the battery. Thereafter, the routine returns.

By contrast, if the engine 1 is required to be activated so that the answer of step S102 is YES, the routine progresses to step S104 to bring the engine 1 into a condition to generate drive force. For example, if the engine 1 is currently stopped, the engine 1 is started. By contrast, if the engine has already been activated, activation of the engine 1 is maintained. Consequently, the vehicle Ve is brought into a condition to be powered by the engine 1.

Then, at step S105, the first motor 2 and the second motor 3 are operated in such a manner as to establish reaction torques against the engine torque. Thereafter, at step S106, any one of the first motor 2 and the second motor 3 is operated as a generator to generate electricity. Thus, both of the first motor 2 and the second motor 3 generates the reaction torques against the engine torque, and one of the first motor 2 and the second motor 3 are operated as a generator.

Figure 5:
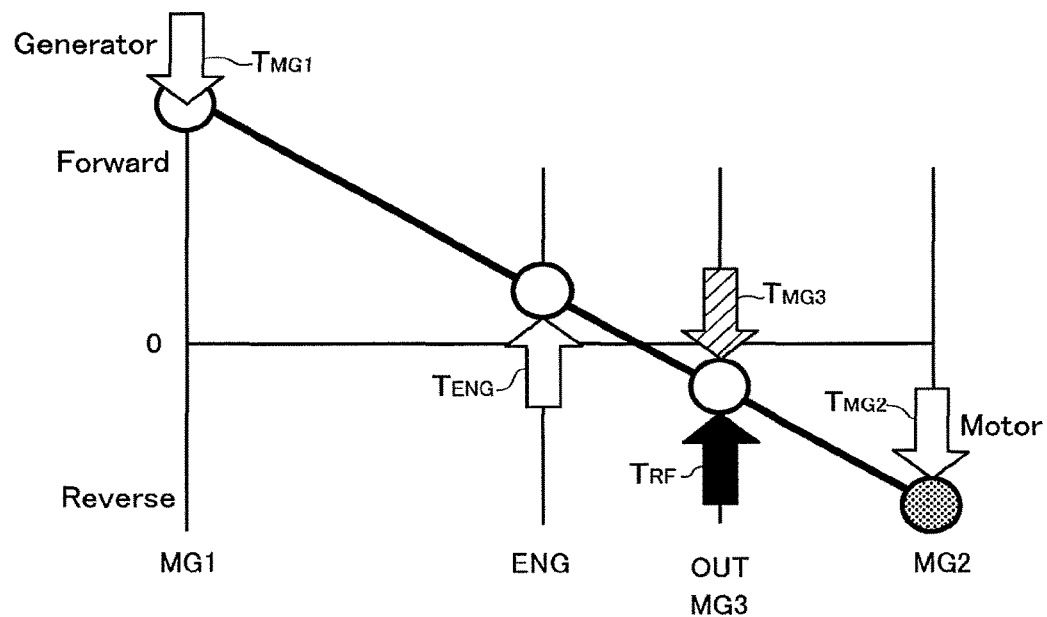
FIG. 5 is a nomographic diagram showing a situation in which the first motor serves as a generator and the second motor serves as a motor during execution of the routine shown in FIG. 4.

Such situation is indicated in FIG. 5 in more detail. As indicated in FIG. 5, the direction of the torque $T_{MG1}$ of the first motor (referred to as "MG1" in FIG. 5) 2 and the direction of the torque $T_{MG2}$ of the second motor (referred to as "MG2" in FIG. 5) 3 are opposite to the direction of the torque $T_{ENG}$ of the engine (referred to as "ENG" in FIG. 3) 1. That is, in the situation shown in FIG. 5, both of the first motor 2 and the second motor 3 connected to the differential mechanism 5 establish the reaction torques against the torque of the engine 1.

In this situation, one of the first motor 2 and the second motor 3 are operated as a generator. In the gear train shown in FIG. 2, as indicated in FIG. 5, the first motor 2 is rotated in the forward direction as the rotational direction of the engine 1 while establishing negative torque so that the first motor 2 serves as a generator. On the other hand, the second motor 3 is rotated in the counter direction while establishing negative torque. That is, the second motor 3 serves as a motor to propel the vehicle Ve in the reverse direction.

Figure 6:
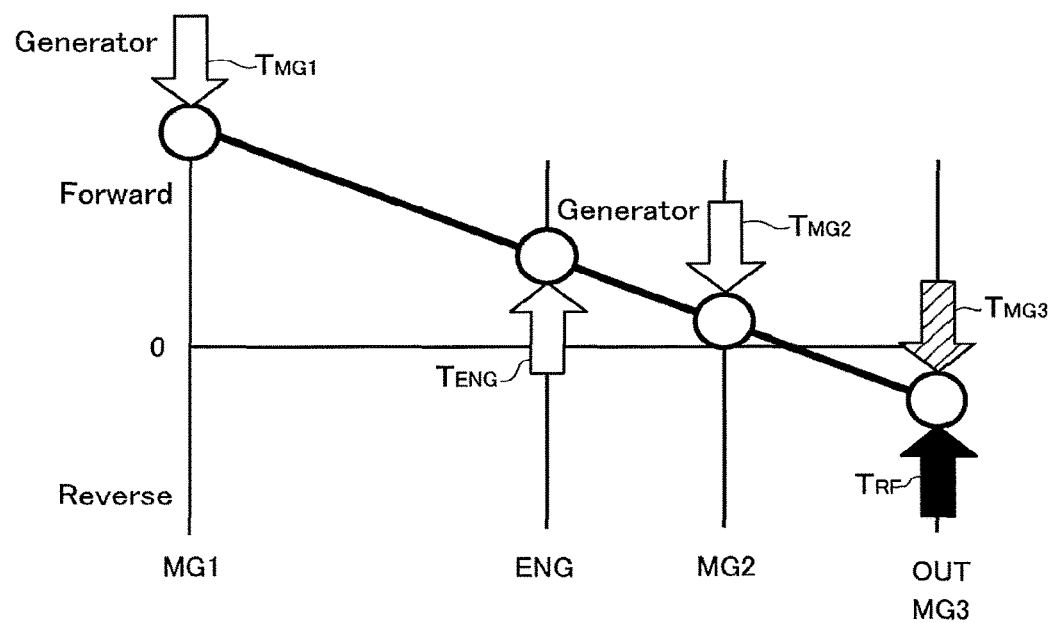
FIG. 6 is a nomographic diagram showing a situation in which the first motor and the second motor individually serve as a generator during execution of the routine shown in FIG. 4.

As shown in FIG. 6, both of the first motor 2 and the second motor 3 may also be operated as motors to propel the vehicle Ve having the gear train to be explained with reference to FIG. 16 in the reverse direction. In this case, the direction of the torque $T_{MG1}$ of the first motor 2 and the direction of the torque $T_{MG2}$ of the second motor 3 are also opposite to the direction of the torque $T_{ENG}$ of the engine 1. Thus, in the situation shown in FIG. 6, both of the first motor 2 connected to a differential mechanism 80 and the second motor 3 also establish the reaction torques against the torque of the engine 1. In FIGS. 5 and 6, the arrow $T_{RF}$ represents reaction force applied to the vehicle from a road surface.

In this case, both of the first motor 2 and the second motor 3 are operated as generators. As indicated in FIG. 6, the first motor 2 is rotated in the forward direction as the rotational direction of the engine 1 while establishing negative torque so that the first motor 2 serves as a generator. On the other hand, the second motor 3 is also rotated in the forward direction while establishing negative torque so that the second motor 3 serves as a generator.

Thereafter, at step S107, the vehicle Ve is propelled in the reverse direction by the drive torque generated by the third motor 4. Specifically, the vehicle Ve is powered in the reverse-motor mode by the third motor 4 operated as a motor by the electricity generated by at least one of the first motor 2 and the second motor 3.

Specifically, as indicated in FIGS. 5 and 6, the third motor 4 is rotated in the direction to generate the torque $T_{MG3}$ counteracting to the torque $T_{ENG}$ of the engine 1. That is, the third motor 4 serves as a motor to generate the drive torque to rotate the drive wheels 6 in the reverse direction. Thus, since the first motor 2 and the second motor 3 establish the reaction torques against the engine torque, the third motor 4 is allowed to generate the drive torque to propel the vehicle Ve in the reverse direction without establishing the reaction torque.

After thus controlling the first motor 2, the second motor 3, and the third motor 4 at steps S105, S106, and S107, the routine returns.

Thus, according to the embodiment, at least one of the first motor 2 and the second motor 3 may be operated as a generator when propelling the vehicle Ve in the reverse direction while activating the engine 1, and in this situation, the reaction torques against the engine torque may be established by both of the first motor 2 and the second motor 3 connected to the differential mechanism 5 (or 80). According to the embodiment, therefore, the third motor 4 connected to the drive wheels 6 through the output unit 7 is allowed to generate the drive torque to propel the vehicle Ve in the reverse direction without establishing the reaction torque. For this reason, undesirable reduction in the drive force resulting from establishing the reaction torque against the engine torque may be prevented when propelling the vehicle Ve while activating the engine 1.

In the case of establishing the reaction torque against the engine torque by both of the first motor 2 and the second motor 3 while propelling vehicle Ve in the reverse direction by the third motor 4, the drive force may drop in a certain high speed range. In order to avoid such reduction in the drive force in the certain speed range, the controller 11 is further configured to switch control contents depending on a vehicle speed when propelling the vehicle Ve in the reverse direction.

Figure 7:
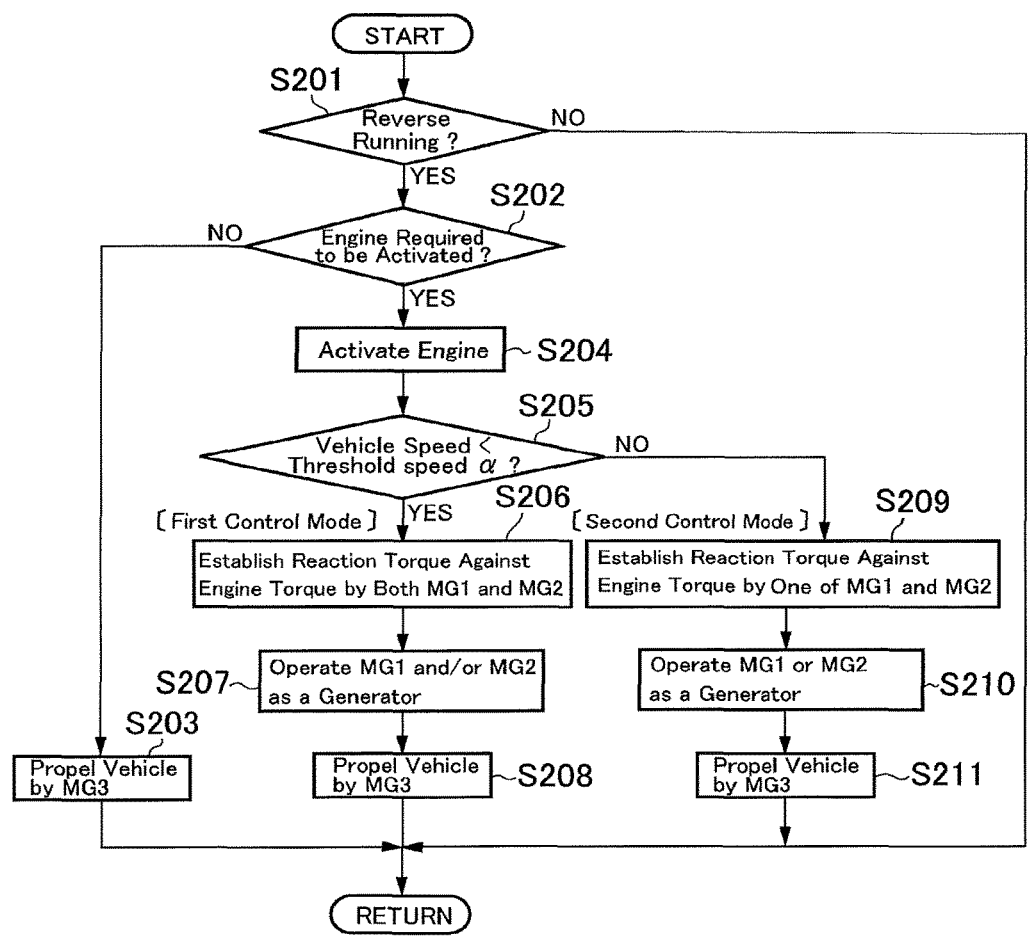
FIG. 7 is a flowchart showing another example of a routine executed by the control system.

To this end, the controller 11 executes the following routine shown in FIG. 7. At step S201, it is determined whether or not the vehicle Ve is currently propelled in the reverse direction. If the vehicle Ve is not propelled in the reverse direction so that the answer of step S201 is NO, the routine returns without carrying out the subsequent controls.

By contrast, if the vehicle Ve is propelled in the reverse direction so that the answer of step S201 is YES, the routine progresses to step S202 to determine whether or not the engine 1 is required to be activated to generate torque to propel the vehicle in the reverse direction.

If the engine 1 is not required to be activated so that the answer of step S202 is NO, the routine progresses to step S203 to propel the vehicle Ve by the drive torque generated by the third motor 4. In this case, specifically, the third motor 4 is controlled in such a manner as to propel the vehicle Ve backwardly in the reverse-motor mode. As described, in the reverse-motor mode, the vehicle Ve may also be propelled in the reverse direction by at least any one of the first motor 2, the second motor 3, and the third motor 4 depending on the SOC level of the battery. Thereafter, the routine returns.

By contrast, if the engine 1 is required to be activated so that the answer of step S202 is YES, the routine progresses to step S204 to bring the engine 1 into a condition to generate drive force. For example, if the engine 1 is currently stopped, the engine 1 is started. By contrast, if the engine has already been activated, activation of the engine 1 is maintained. Consequently, the vehicle Ve is brought into a condition to be powered by the engine 1.

Thereafter, it is determined at step S205 whether or not a speed of the vehicle Ve propelling in the reverse direction is lower than a predetermined threshold speed a as a criterion value to switch the control mode between the below-mentioned "first control mode" and "second control mode".

Specifically, the first control mode is selected to establish the reaction torques against the engine torque by both of the first motor 2 and the second motor 3, and to generate the drive torque to propel the vehicle Ve in the reverse direction by the third motor 4 while activating the engine 1. On the other hand, the second control mode is selected to establish the reaction torques against the engine torque by any one of the first motor 2 and the second motor 3, and to generate the drive torque to propel the vehicle Ve in the reverse direction by the third motor 4 while activating the engine 1.

Figure 8:
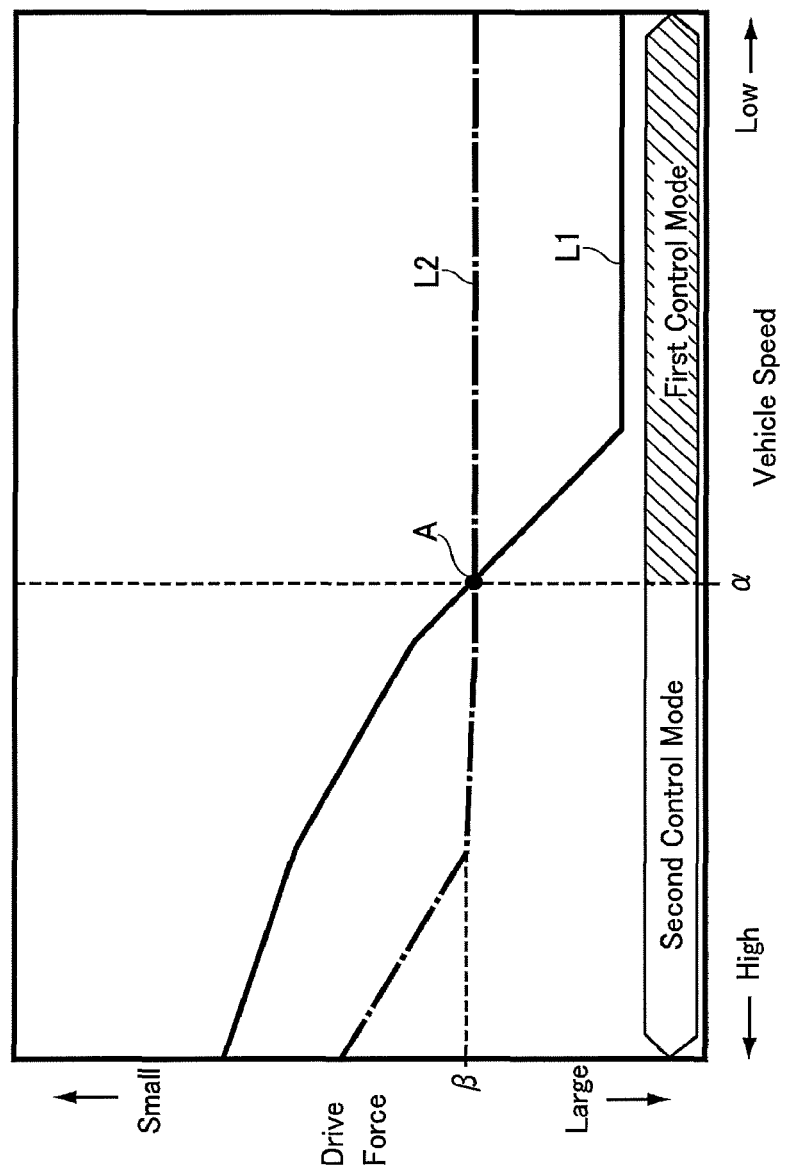
FIG. 8 is a graph showing a threshold speed at which a control mode is shifted from a first control mode to a second control mode.

A relation between the vehicle speed and the drive force in the first control mode and the second control mode is indicated in FIG. 8. In FIG. 8, specifically the solid line L1 represents a relation between the vehicle speed and the drive force in the first control mode, and the dashed line L2 represents a relation between the vehicle speed and the drive force in the second control mode. As indicated in FIG. 8, in the first control mode, the drive force propelling the vehicle Ve in the reverse direction drops in the high speed range. On the other hand, in the second control mode, the drive force is smaller in the high speed range, but the range in which a reduction in the drive force occurs is narrower. The drive force in the first mode drops gradually in the high speed range and eventually falls below the drive force in the second mode at point A. According to the embodiment, therefore, the threshold speed α is set to the point A based on a result of experimentation or simulation.

If the speed of the vehicle Ve is lower than the threshold speed α so that the answer of step S205 is YES, the routine progresses to step S206 to execute the subsequent controls in the first control mode.

At step S206, both of the first motor 2 and the second motor 3 are operated in such a manner as to the establish reaction torques against the engine torque.

Thereafter, at step S207, at least any one of the first motor 2 and the second motor 3 is operated as a generator to generate electricity. That is, both of the first motor 2 and the second motor 3 generates the reaction torques against the engine torque, and one of the first motor 2 and the second motor 3 are operated as a generator.

Thereafter, at step S208, the vehicle Ve is propelled in the reverse direction by the drive torque generated by the third motor 4. Specifically, the vehicle Ve is powered in the reverse-motor mode by the third motor 4 operated as a motor by the electricity generated by at least one of the first motor 2 and the second motor 3. As described, in this situation, the third motor 4 is rotated in the direction to generate the torque counteracting the torque of the engine 1. That is, the third motor 4 serves as a motor to generate the drive torque to rotate the drive wheels 6 in the reverse direction. In this case, since the first motor 2 and the second motor 3 establish the reaction torques against the engine torque, the third motor 4 is allowed to generate the drive torque to propel the vehicle Ve in the reverse direction without establishing the reaction torque.

After thus controlling the first motor 2, the second motor 3, and the third motor 4 at steps S206, S207, and S208, the routine returns.

By contrast, if the speed of the vehicle Ve is lower than the threshold speed a so that the answer of step S205 is NO, the routine progresses to step S209 to execute the subsequent controls in the second control mode.

At step S209, any one of the first motor 2 and the second motor 3 are operated in such a manner as to the establish the reaction torque against the engine torque.

Thereafter, at step S210, any one of the first motor 2 and the second motor 3 is operated as a generator to generate electricity. That is, any one of the first motor 2 and the second motor 3 generates the reaction torques against the engine torque, and any one of the first motor 2 and the second motor 3 are operated as a generator.

Thereafter, at step S211, the vehicle Ve is propelled in the reverse direction by the drive torque generated by the third motor 4. Specifically, the vehicle Ve is powered in the reverse-motor mode by the third motor 4 operated as a motor by the electricity generated by any one of the first motor 2 and the second motor 3. In this situation, the third motor 4 is rotated in the direction to generate the torque counteracting to the torque of the engine 1. That is, the third motor 4 serves as a motor to generate the drive torque to rotate the drive wheels 6 in the reverse direction. In this case, since any one of the first motor 2 and the second motor 3 establishes the reaction torques against the engine torque, the third motor 4 is also allowed to generate the drive torque to propel the vehicle Ve in the reverse direction without establishing the reaction torque.

After thus controlling the first motor 2, the second motor 3, and the third motor 4 at steps S209, S210, and S211, the routine returns.

Figure 9:
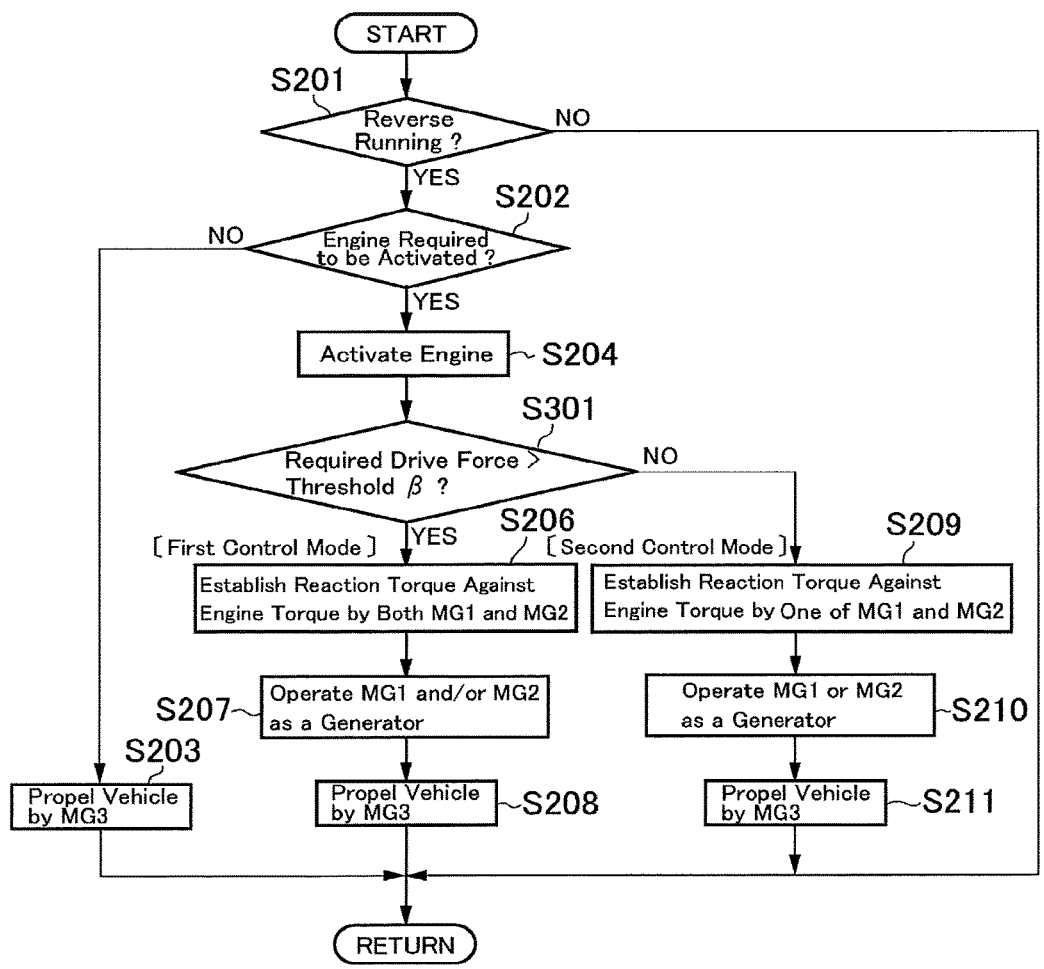
FIG. 9 is a flowchart showing a modification of the routine shown in FIG. 7.
Figure 10:
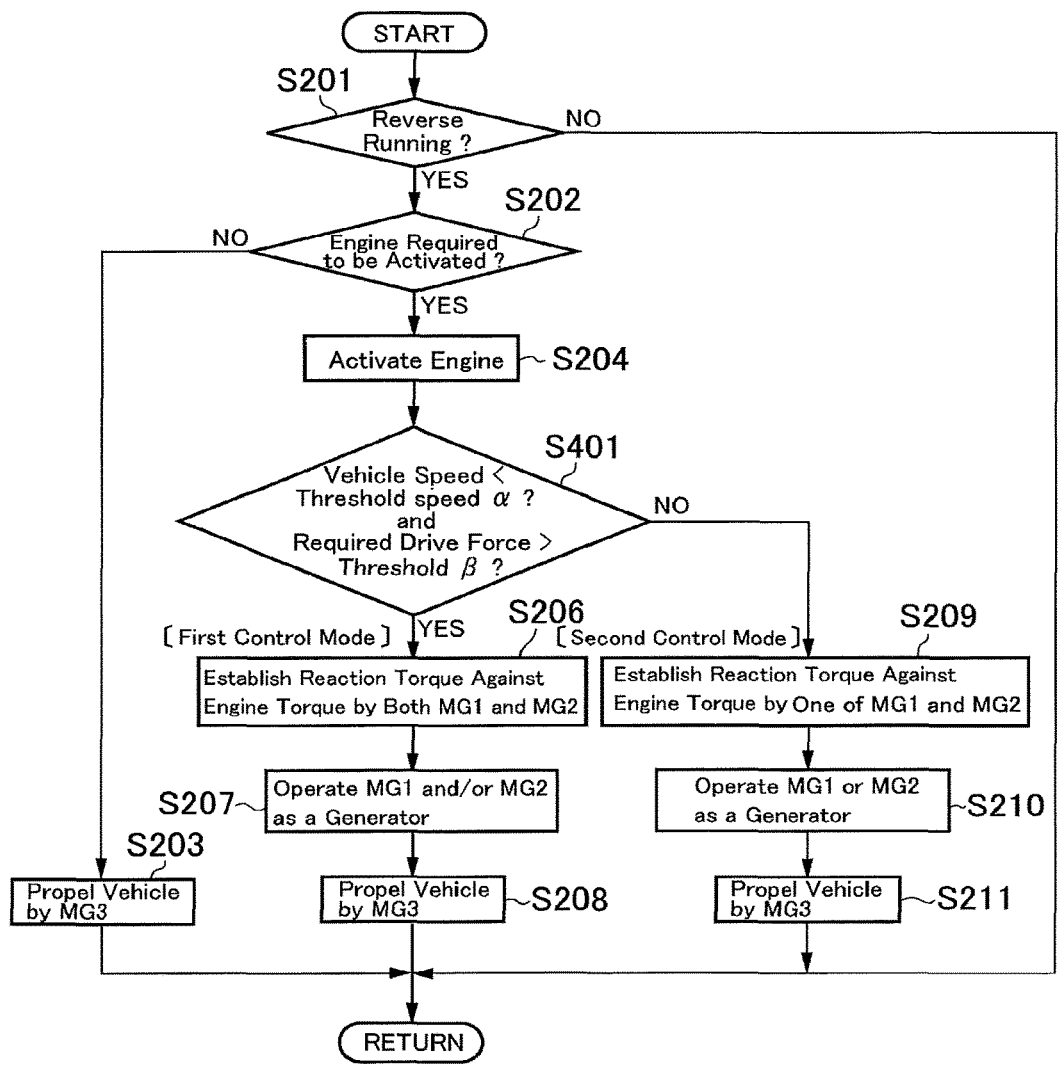
FIG. 10 is a flowchart showing another modification of the routine shown in FIG. 7.

In the routine shown in FIG. 7, the determination at step S205 may also be replaced by step S301 of the routine shown in FIG. 9, or step S401 of the routine shown in FIG. 10. In the routines shown in FIGS. 9 and 10, the remaining steps are identical to those of the routine shown in FIG. 7.

In the routine shown in FIG. 9, at step S301, it is determined whether or not a required drive force to propel the vehicle Ve in the reverse direction is larger than a predetermined threshold value ß as another criterion to switch the control mode between the first control mode and the second control mode. As indicated in FIG. 8, in the second control mode, the drive force is smaller in the high speed range but stable drive force may be achieved in the remaining speed range. In the routine shown in FIG. 9, accordingly, the threshold value ß is set to the drive force thus achieved stably in the second control mode based on a result of experimentation or simulation.

If the required drive force is larger than the threshold value ß so that the answer of step S301 is YES, the routine progresses to step S206 to execute the subsequent controls in the first control mode. By contrast, if the required drive force is smaller than the threshold value ß so that the answer of step S301 is NO, the routine progresses to step S209 to execute the subsequent controls in the second control mode.

In the routine shown in FIG. 10, at step S401, it is determined whether or not the speed of the vehicle Ve propelling in the reverse direction is lower than the threshold speed α, and whether or not the required drive force to propel the vehicle Ve in the reverse direction is larger than the threshold value ß. As indicated in FIG. 8, even if the vehicle speed is lower than the threshold speed α in the second control mode, it is still possible to achieve the required drive force in the second control mode if the required drive force is small. In the routine shown in FIG. 10, therefore, the threshold speed α and the threshold value ß are used to switch the control mode more accurately between the first control mode and the second control mode depending on the situation.

If the vehicle speed is lower than the threshold speed α, and the required drive force is larger than the threshold value ß so that the answer of step S401 is YES, the routine progresses to step S206 to execute the subsequent controls in the first control mode. By contrast, if the vehicle speed is higher than the threshold speed α, or the required drive force is smaller than the threshold value ß so that the answer of step S401 is NO, the routine progresses to step S209 to execute the subsequent controls in the second control mode.

The control system according to the embodiment may also be applied to hybrid vehicles having different kinds of the gear trains shown in FIGS. 11 to 20. In FIGS. 11 to 20, common reference numerals are allotted to the elements in common with those in the gear train shown in FIG. 2, and detailed explanation for those common elements will be omitted.

Figure 11:
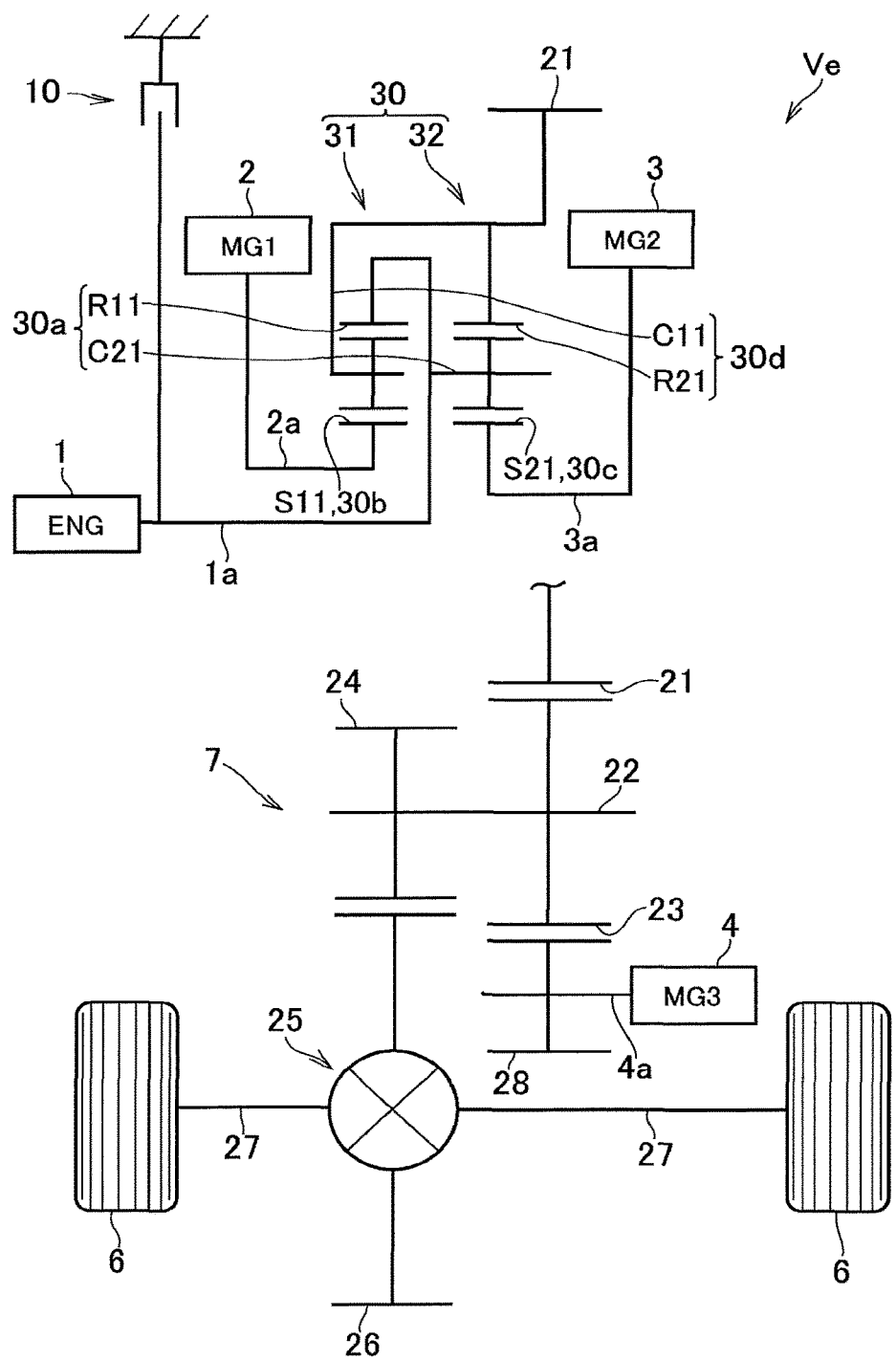
FIG. 11 is a schematic illustration showing a second example of the gear train of the hybrid vehicle.

FIG. 11 shows the second example of the gear train of the vehicle Ve. In the vehicle Ve shown in FIG. 11, the prime mover also includes the engine 1, the first motor 2, the second motor 3, and the third motor 4. The vehicle Ve shown in FIG. 11 further comprises a differential mechanism 30 serving as a power split device. The differential mechanism 30 is also a complex planetary gear unit including a single-pinion first planetary gear unit 31 and a single-pinion second planetary gear unit 32 connected to each other. The differential mechanism 30 includes a first rotary element 30a to which the engine 1 is connected, a second rotary element 30b to which the first motor 2 is connected, a third rotary element 30c to which the second motor 3 is connected, and a fourth rotary element 30d to which the output unit 7 is connected.

The first planetary gear unit 31 includes a first sun gear S11, a first ring gear R11, and a first carrier C11. Likewise, the second planetary gear unit 32 includes a second sun gear S21, a second ring gear R21, and a second carrier C21. The first ring gear R11 and the second carrier C21 are connected to each other, and the first carrier C11 and the second ring gear R21 are connected to each other.

In the differential mechanism 30, the first ring gear R11 and the second carrier C21 are connected to the output shaft 1a of the engine 1, the first sun gear S11 is connected to the output shaft 2a of the first motor 2, the second sun gear S21 is connected to the output shaft 3a of the second motor 3, and the first carrier C11 and the second ring gear R21 are connected to the output unit 7.

In the differential mechanism 30, accordingly, the first ring gear R11 and the second carrier C21 serve as the first rotary element 30a, the first sun gear S11 serves as the second rotary element 30b, the second sun gear S21 serves as the third rotary element 30c, and the first carrier C11 and the second ring gear R21 serve as the fourth rotary element 30d.

Figure 12:
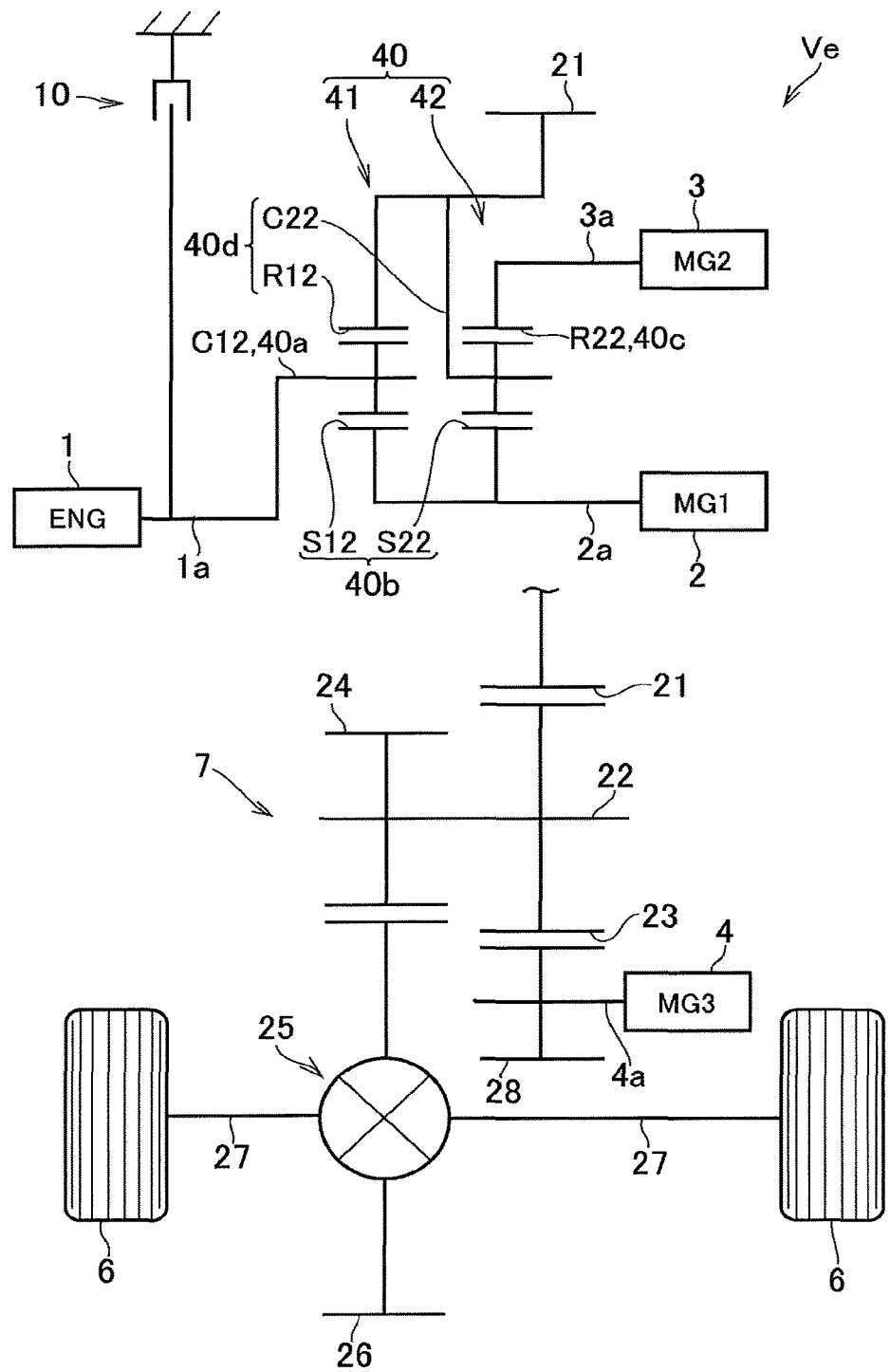
FIG. 12 is a schematic illustration showing a third example of the gear train of the hybrid vehicle.

FIG. 12 shows the third example of the gear train of the vehicle Ve. In the vehicle Ve shown in FIG. 12, the prime mover also includes the engine 1, the first motor 2, the second motor 3, and the third motor 4. The vehicle Ve shown in FIG. 12 further comprises a differential mechanism 40 serving as a power split device. The differential mechanism 40 is also a complex planetary gear unit including a single-pinion first planetary gear unit 41 and a single-pinion second planetary gear unit 42 connected to each other. The differential mechanism 40 includes a first rotary element 40a to which the engine 1 is connected, a second rotary element 40b to which the first motor 2 is connected, a third rotary element 40c to which the second motor 3 is connected, and a fourth rotary element 40d to which the output unit 7 is connected.

The first planetary gear unit 41 includes a first sun gear S12, a first ring gear R12, and a first carrier C12. Likewise, the second planetary gear unit 42 includes a second sun gear S22, a second ring gear R22, and a second carrier C22. The first sun gear S12 and the second sun gear S22 are connected to each other, and the first ring gear R12 and second carrier C22 are connected to each other.

In the differential mechanism 40, the first carrier C12 is connected to the output shaft 1a of the engine 1, the first sun gear S12 and the second sun gear S22 are connected to the output shaft 2a of the first motor 2, the second ring gear R22 is connected to the output shaft 3a of the second motor 3, and the first ring gear R12 and the second carrier C22 are connected to the output unit 7.

In the differential mechanism 40, accordingly, the first carrier C12 serve as the first rotary element 40a, the first sun gear S12 and the second sun gear S22 serve as the second rotary element 40b, the second ring gear R22 serves as the third rotary element 40c, and the first ring gear R12 and the second carrier C22 serve as the fourth rotary element 40d.

Figure 13:
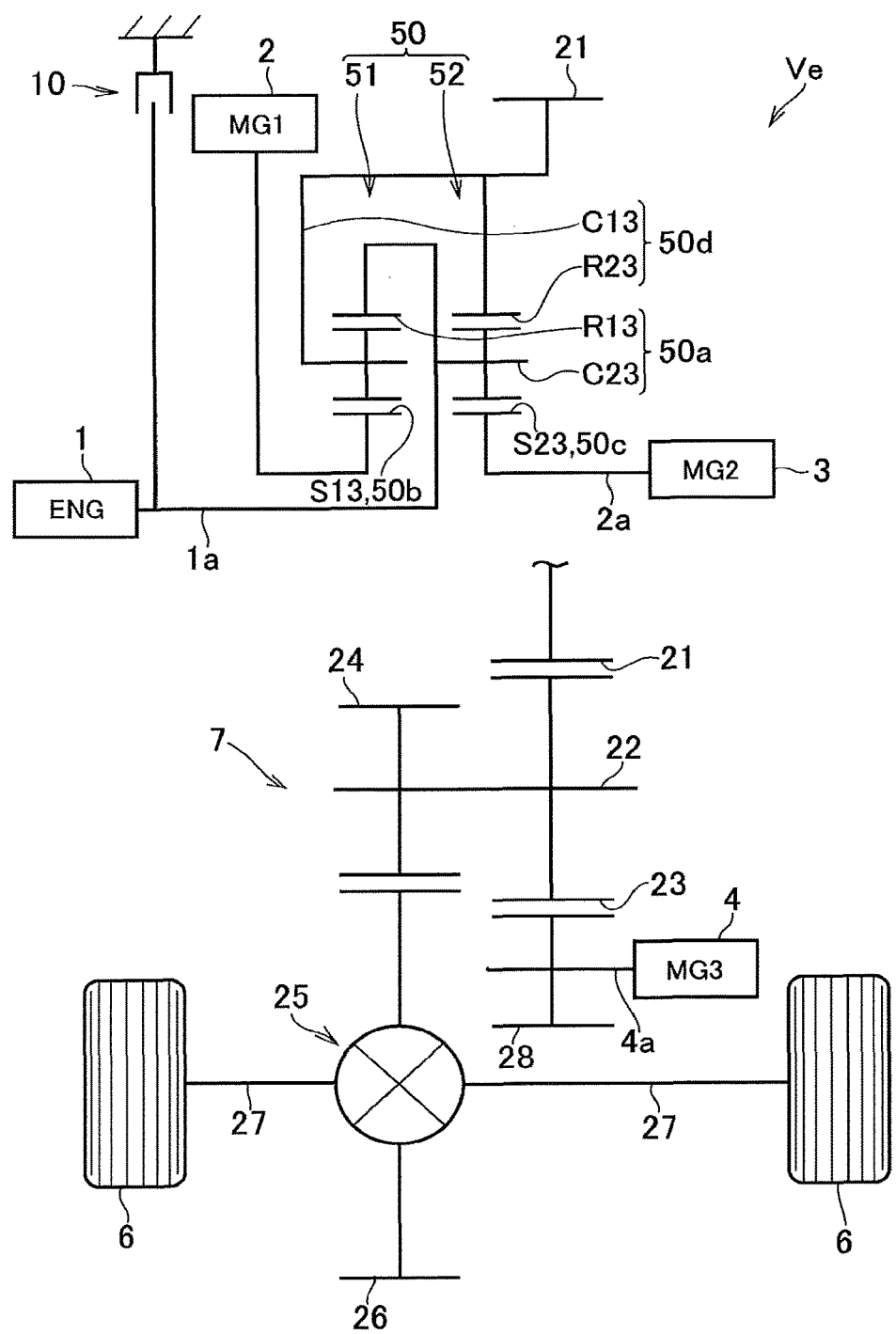
FIG. 13 is a schematic illustration showing a fourth example of the gear train of the hybrid vehicle.

FIG. 13 shows the fourth example of the gear train of the vehicle Ve. In the vehicle Ve shown in FIG. 13, the prime mover also includes the engine 1, the first motor 2, the second motor 3, and the third motor 4. The vehicle Ve shown in FIG. 13 further comprises a differential mechanism 50 serving as a power split device. The differential mechanism 50 is also a complex planetary gear unit including a single-pinion first planetary gear unit 51 and a single-pinion second planetary gear unit 52 connected to each other. The differential mechanism 50 includes a first rotary element 50a to which the engine 1 is connected, a second rotary element 50b to which the first motor 2 is connected, a third rotary element 50c to which the second motor 3 is connected, and a fourth rotary element 50d to which the output unit 7 is connected.

The first planetary gear unit 51 includes a first sun gear S13, a first ring gear R13, and a first carrier C13. Likewise, the second planetary gear unit 52 includes a second sun gear S23, a second ring gear R23, and a second carrier C23. The first ring gear R13 and the second carrier C23 are connected to each other, and the first carrier C13 and the second ring gear R23 are connected to each other.

In the differential mechanism 50, the first ring gear R13 and the second carrier C23 are connected to the output shaft 1a of the engine 1, the first sun gear S13 is connected to the output shaft 2a of the first motor 2, the second sun gear S23 is connected to the output shaft 3a of the second motor 3, and the first carrier C13 and the second ring gear R23 are connected to the output unit 7.

In the differential mechanism 50, accordingly, the first ring gear R13 and the second carrier C23 serve as the first rotary element 50a, the first sun gear S13 serves as the second rotary element 50b, the second sun gear S23 serves as the third rotary element 50c, and the first carrier C13 and the second ring gear R23 serve as the fourth rotary element 50d.

Figure 14:
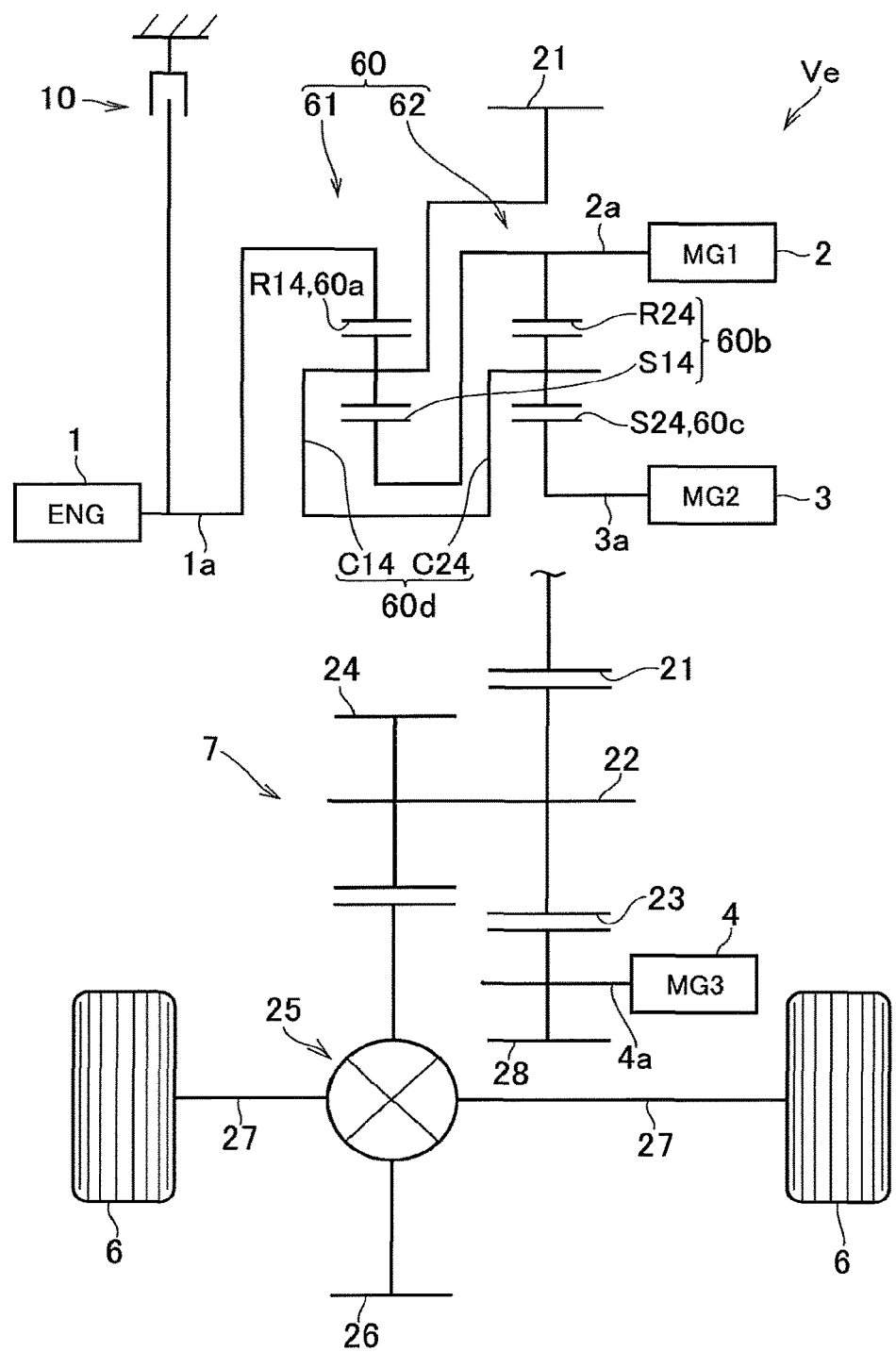
FIG. 14 is a schematic illustration showing a fifth example of the gear train of the hybrid vehicle.

FIG. 14 shows the fifth example of the gear train of the vehicle Ve. In the vehicle Ve shown in FIG. 14, the prime mover also includes the engine 1, the first motor 2, the second motor 3, and the third motor 4. The vehicle Ve shown in FIG. 14 further comprises a differential mechanism 60 serving as a power split device. The differential mechanism 60 is also a complex planetary gear unit including a single-pinion first planetary gear unit 61 and a single-pinion second planetary gear unit 62 connected to each other. The differential mechanism 60 includes a first rotary element 60a to which the engine 1 is connected, a second rotary element 60b to which the first motor 2 is connected, a third rotary element 60c to which the second motor 3 is connected, and a fourth rotary element 60d to which the output unit 7 is connected.

The first planetary gear unit 61 includes a first sun gear S14, a first ring gear R14, and a first carrier C14. Likewise, the second planetary gear unit 62 includes a second sun gear S24, a second ring gear R24, and a second carrier C24. The first sun gear S14 and the second ring gear R24 are connected to each other, and the first carrier C14 and the second carrier C24 are connected to each other.

In the differential mechanism 60, the first ring gear R14 is connected to the output shaft 1a of the engine 1, the first sun gear S14 and the second ring gear R24 are connected to the output shaft 2a of the first motor 2, the second sun gear S24 is connected to the output shaft 3a of the second motor 3, and the first carrier C14 and the second carrier C24 are connected to the output unit 7.

In the differential mechanism 60, accordingly, the first ring gear R14 serves as the first rotary element 60a, the first sun gear S14 and the second ring gear R24 serve as the second rotary element 60b, the second sun gear S24 serves as the third rotary element 60c, and the first carrier C14 and the second carrier C24 serve as the fourth rotary element 60d.

Figure 15:
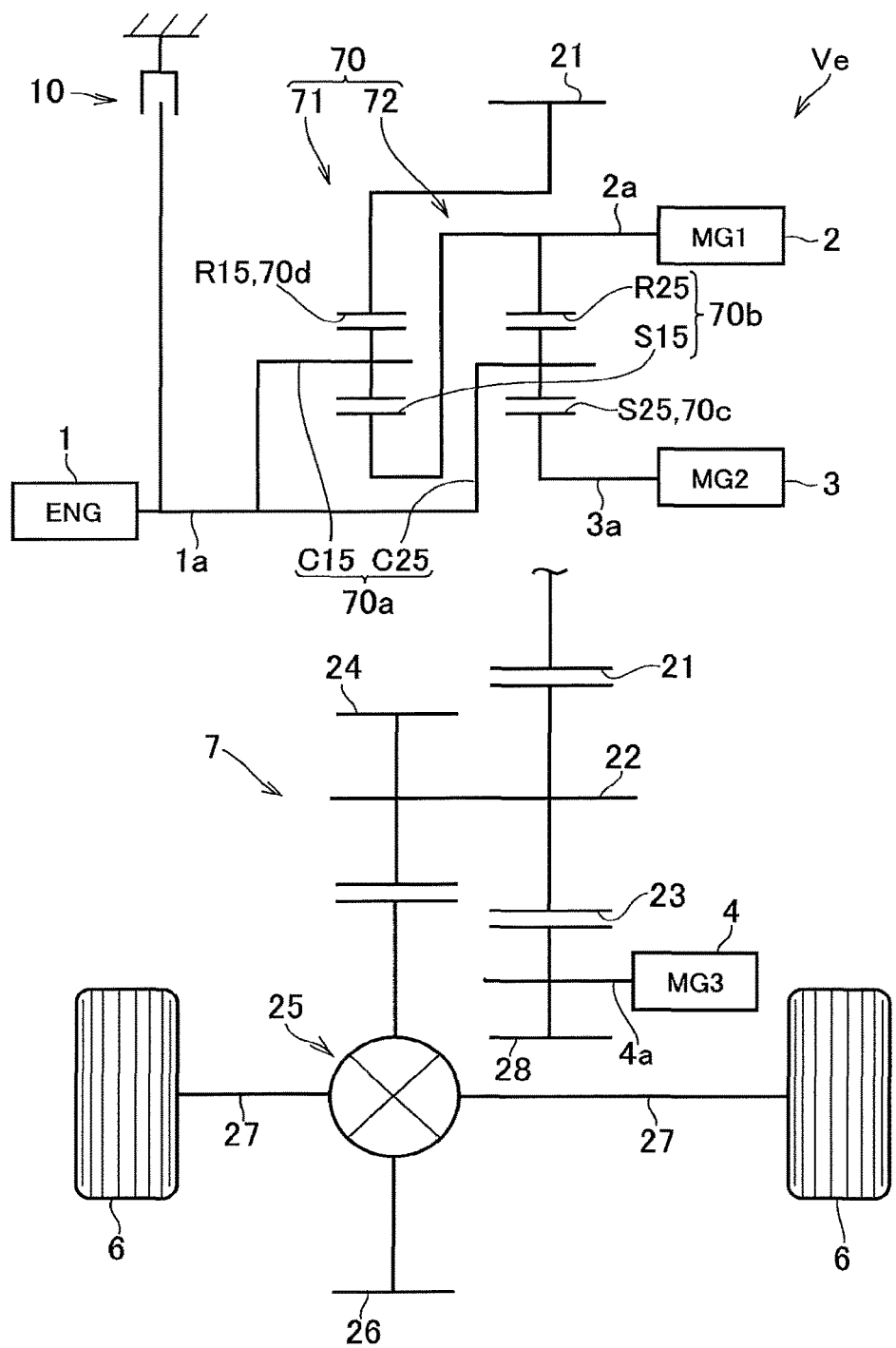
FIG. 15 is a schematic illustration showing a sixth example of the gear train of the hybrid vehicle.

FIG. 15 shows the sixth example of the gear train of the vehicle Ve. In the vehicle Ve shown in FIG. 15, the prime mover also includes the engine 1, the first motor 2, the second motor 3, and the third motor 4. The vehicle Ve shown in FIG. 15 further comprises a differential mechanism 70 serving as a power split device. The differential mechanism 70 is also a complex planetary gear unit including a single-pinion first planetary gear unit 71 and a single-pinion second planetary gear unit 72 connected to each other. The differential mechanism 70 includes a first rotary element 70a to which the engine 1 is connected, a second rotary element 70b to which the first motor 2 is connected, a third rotary element 70c to which the second motor 3 is connected, and a fourth rotary element 70d to which the output unit 7 is connected.

The first planetary gear unit 71 includes a first sun gear S15, a first ring gear R15, and a first carrier C15. Likewise, the second planetary gear unit 72 includes a second sun gear S25, a second ring gear R25, and a second carrier C25. The first carrier C15 and the second carrier C25 are connected to each other, and the first sun gear S15 and the second ring gear R25 are connected to each other.

In the differential mechanism 70, the first carrier C15 and the second carrier C25 are connected to the output shaft 1a of the engine 1, the first sun gear S15 and the second ring gear R25 are connected to the output shaft 2a of the first motor 2, the second sun gear S25 is connected to the output shaft 3a of the second motor 3, and the first ring gear R15 is connected to the output unit 7.

In the differential mechanism 70, accordingly, the first carrier C15 and the second carrier C25 serve as the first rotary element 70a, the first sun gear S15 and the second ring gear R25 serve as the second rotary element 70b, the second sun gear S25 serves as the third rotary element 70c, and the first ring gear R15 serve as the fourth rotary element 70d.

Figure 16:
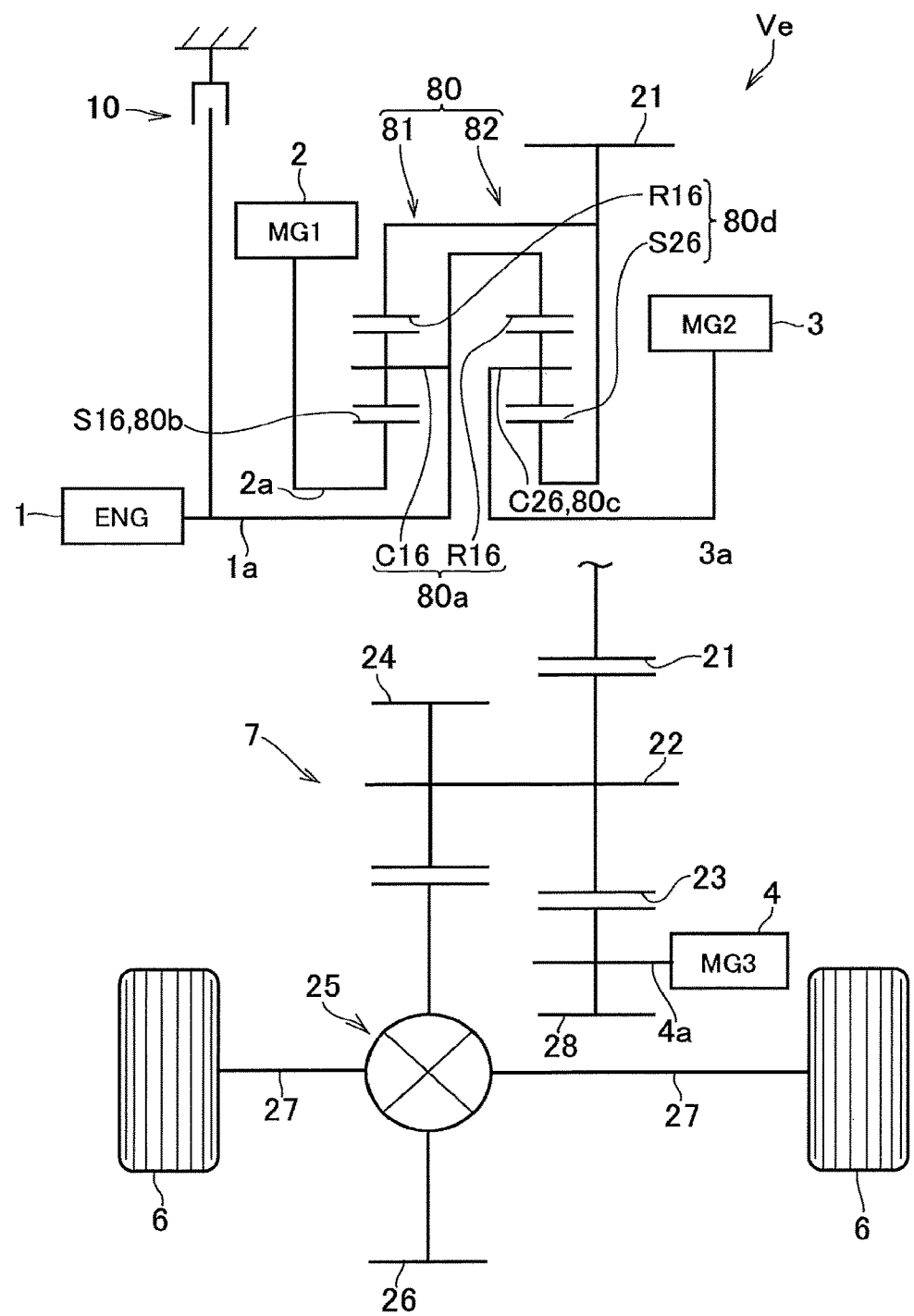
FIG. 16 is a schematic illustration showing a seventh example of the gear train of the hybrid vehicle.

FIG. 16 shows the seventh example of the gear train of the vehicle Ve. In the vehicle Ve shown in FIG. 16, the prime mover also includes the engine 1, the first motor 2, the second motor 3, and the third motor 4. The vehicle Ve shown in FIG. 16 further comprises a differential mechanism 80 serving as a power split device. The differential mechanism 80 is also a complex planetary gear unit including a single-pinion first planetary gear unit 81 and a single-pinion second planetary gear unit 82 connected to each other. The differential mechanism 80 includes a first rotary element 80a to which the engine 1 is connected, a second rotary element 80b to which the first motor 2 is connected, a third rotary element 80c to which the second motor 3 is connected, and a fourth rotary element 80d to which the output unit 7 is connected.

The first planetary gear unit 81 includes a first sun gear S16, a first ring gear R16, and a first carrier C16. Likewise, the second planetary gear unit 82 includes a second sun gear S26, a second ring gear R26, and a second carrier C26. The first carrier C16 and the second ring gear R26 are connected to each other, and the first ring gear R16 and the second sun gear S26 are connected to each other.

In the differential mechanism 80, the first carrier C16 and the second ring gear R26 are connected to the output shaft 1a of the engine 1, the first sun gear S16 is connected to the output shaft 2a of the first motor 2, the second carrier C26 is connected to the output shaft 3a of the second motor 3, and the first ring gear R16 and the second sun gear S26 are connected to the output unit 7.

In the differential mechanism 80, accordingly, the first carrier C16 and the second ring gear R26 serve as the first rotary element 80a, the first sun gear S16 serves as the second rotary element 80b, the second carrier C26 serves as the third rotary element 80c, and the first ring gear R16 and the second sun gear S26 serve as the fourth rotary element 80d.

According to the embodiment of the present disclosure, other kinds of planetary gear units such as a double-pinion planetary gear unit and a Ravigneaux planetary gear unit may also be used as the differential mechanism instead of the single-pinion planetary gear unit.

Figure 17:
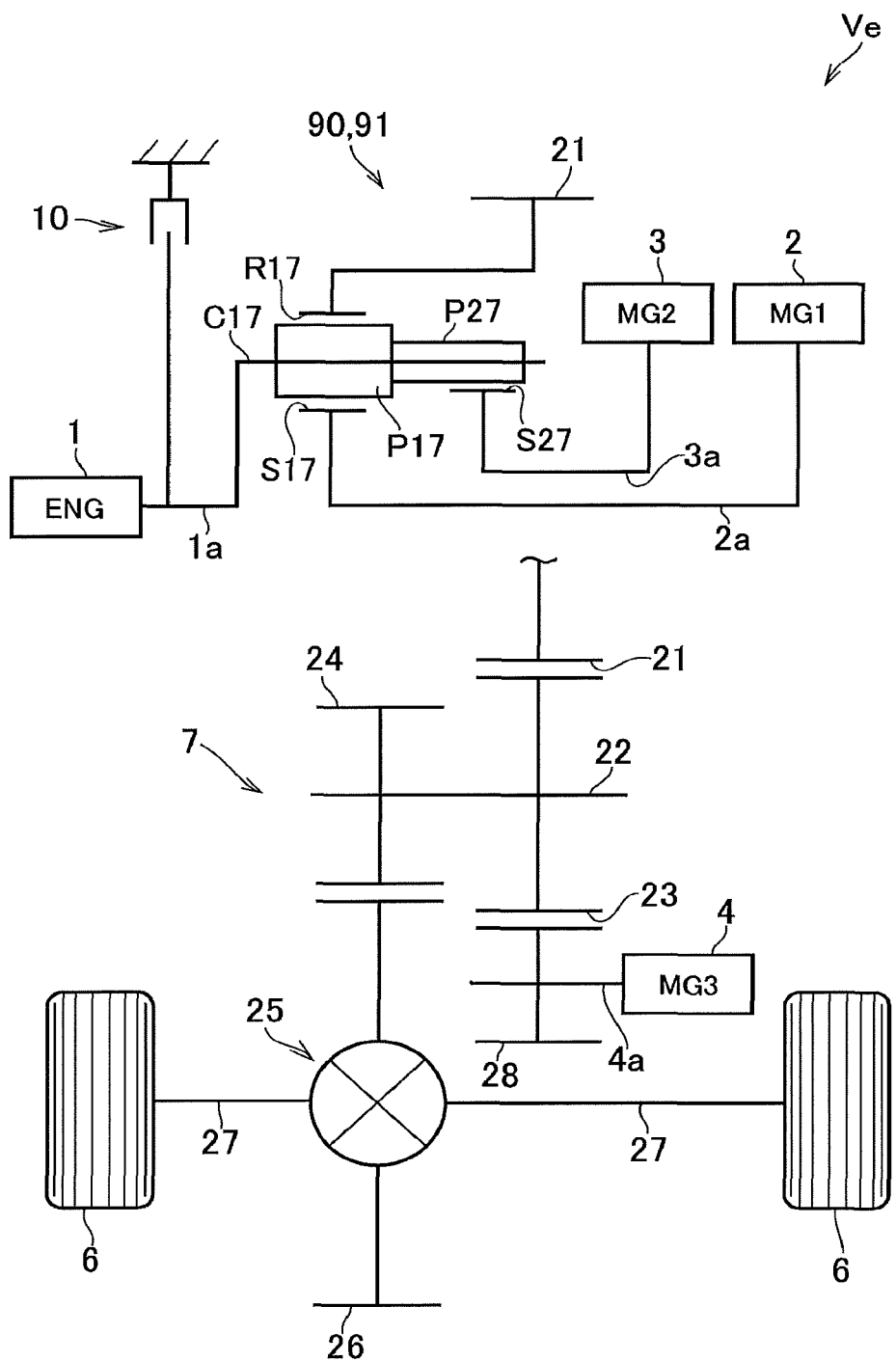
FIG. 17 is a schematic illustration showing an eighth example of the gear train of the hybrid vehicle.

FIG. 17 shows the eighth example of the gear train of the vehicle Ve. In the vehicle Ve shown in FIG. 17, the prime mover also includes the engine 1, the first motor 2, the second motor 3, and the third motor 4. The vehicle Ve shown in FIG. 17 further comprises a differential mechanism 90 serving as a power split device. In the gear train shown in FIG. 17, a Ravigneaux planetary gear unit 91 is used as the differential mechanism 90. The differential mechanism 90 includes a first rotary element 90a to which the engine 1 is connected, a second rotary element 90b to which the first motor 2 is connected, a third rotary element 90c to which the second motor 3 is connected, and a fourth rotary element 90d to which the output unit 7 is connected.

The Ravigneaux planetary gear unit 91 includes a first sun gear S17, a ring gear R17, a carrier C17, and a second sun gear S27. Specifically, Ravigneaux planetary gear unit 91 includes the first sun gear S17, the ring gear R17 arranged around the first sun gear S17, a second sun gear S27 arranged coaxially with the first sun gear S17 while being allowed to rotate relatively thereto, a plurality of short pinion gears P17 meshing with the first sun gear S17 and the ring gear R17, a plurality of long pinion gears P27 individually connected to the short pinion gears P17 while being meshed with the second sun gear S27, and a carrier C17 supporting the short pinion gears P17 and the long pinion gears P27 in a rotatable manner.

In the Ravigneaux planetary gear unit 91, the carrier C17 is connected to the output shaft 1a of the engine 1, the first sun gear S17 is connected to the output shaft 2a of the first motor 2, the second sun gear S27 is connected to the output shaft 3a of the second motor 3, and the ring gear R17 is connected to the output unit 7.

In the differential mechanism 90, accordingly, the carrier C17 serves as the first rotary element 90a, the first sun gear S17 serves as the second rotary element 90b, the second sun gear S27 serves as the third rotary element 90e, and the ring gear R17 serve as the fourth rotary element 90d.

According to the embodiment of the present disclosure, a differential mechanism having five rotary elements may also be used instead of the foregoing differential mechanisms.

Figure 18:
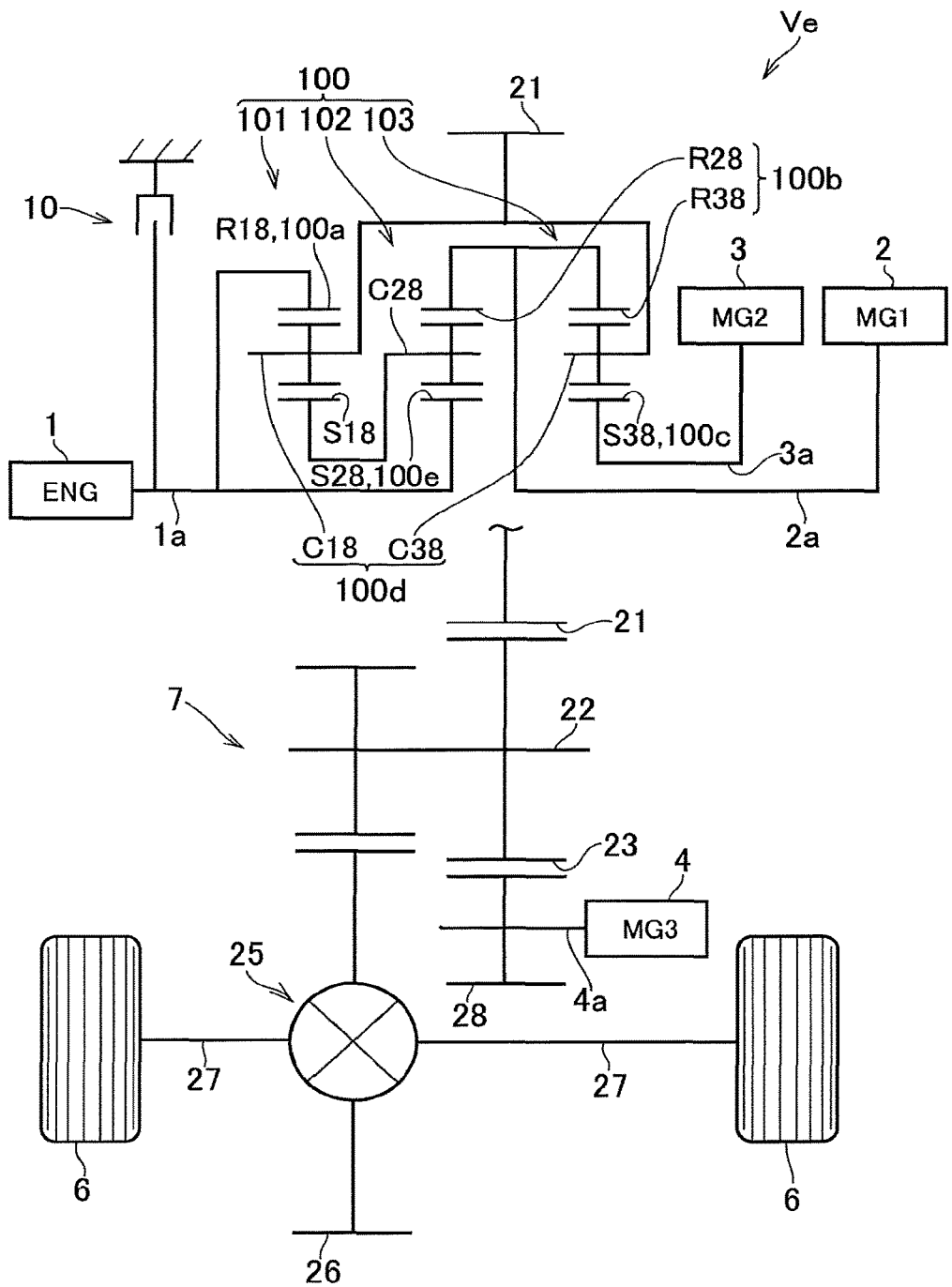
FIG. 18 is a schematic illustration showing a ninth example of the gear train of the hybrid vehicle.

FIG. 18 shows the ninth example of the gear train of the vehicle Ve. In the vehicle Ve shown in FIG. 18, the prime mover also includes the engine 1, the first motor 2, the second motor 3, and the third motor 4. The vehicle Ve shown in FIG. 18 further comprises a differential mechanism 100 serving as a power split device. The differential mechanism 100 is a complex planetary gear unit formed by combining a single-pinion first planetary gear unit 101, a single-pinion second planetary gear unit 102, and a single-pinion third planetary gear unit 103. The differential mechanism 100 includes a first rotary element 100a to which the engine 1 is connected, a second rotary element 100b to which the first motor 2 is connected, a third rotary element 100c to which the second motor 3 is connected, a fourth rotary element 100*d* to which the output unit 7 is connected, and a fifth rotary element 100*e* to which the engine 1 and the first rotary element 100*a* are connected.

The first planetary gear unit 101 includes a first sun gear S18, a first ring gear R18, and a first carrier C18. Likewise, the second planetary gear unit 102 includes a second sun gear S28, a second ring gear R28, and a second carrier C28. Likewise, the third planetary gear unit 103 includes a third sun gear S38, a third ring gear R38, and a third carrier C38. The first sun gear S18 and the second carrier C28 are connected to each other, the first ring gear R18 and the second sun gear S28 are connected to each other, the second ring gear R28 and the third ring gear R38 are connected to each other, and the first carrier C18 and the third carrier C38 are connected to each other.

In the differential mechanism 100, the first ring gear R18 is connected to the output shaft 1*a* of the engine 1, the second ring gear R28 and the third ring gear R38 are connected to the output shaft 2*a* of the first motor 2, the third sun gear S38 is connected to the output shaft 3*a* of the second motor 3, the first carrier C18 and the third carrier C38 are connected to the output unit 7, and the second sun gear S28 and the first ring gear R18 are connected to the output shaft 1*a* of the engine 1.

In the differential mechanism 100, accordingly, the first ring gear R18 serve as the first rotary element 100*a*, the second ring gear R26 and the third ring gear R38 serve as the second rotary element 100*b*, the third sun gear S38 serves as the third rotary element 100*c,* the first carrier C18 and the third carrier C38 serve as the fourth rotary element 100*d,* and the second sun gear S28 serves as the fifth rotary element 100*e*.

According to the embodiment of the present disclosure, each pair of the front wheels and the rear wheels may be equipped individually with the output unit to deliver power to those pairs of wheels.

Figure 19:
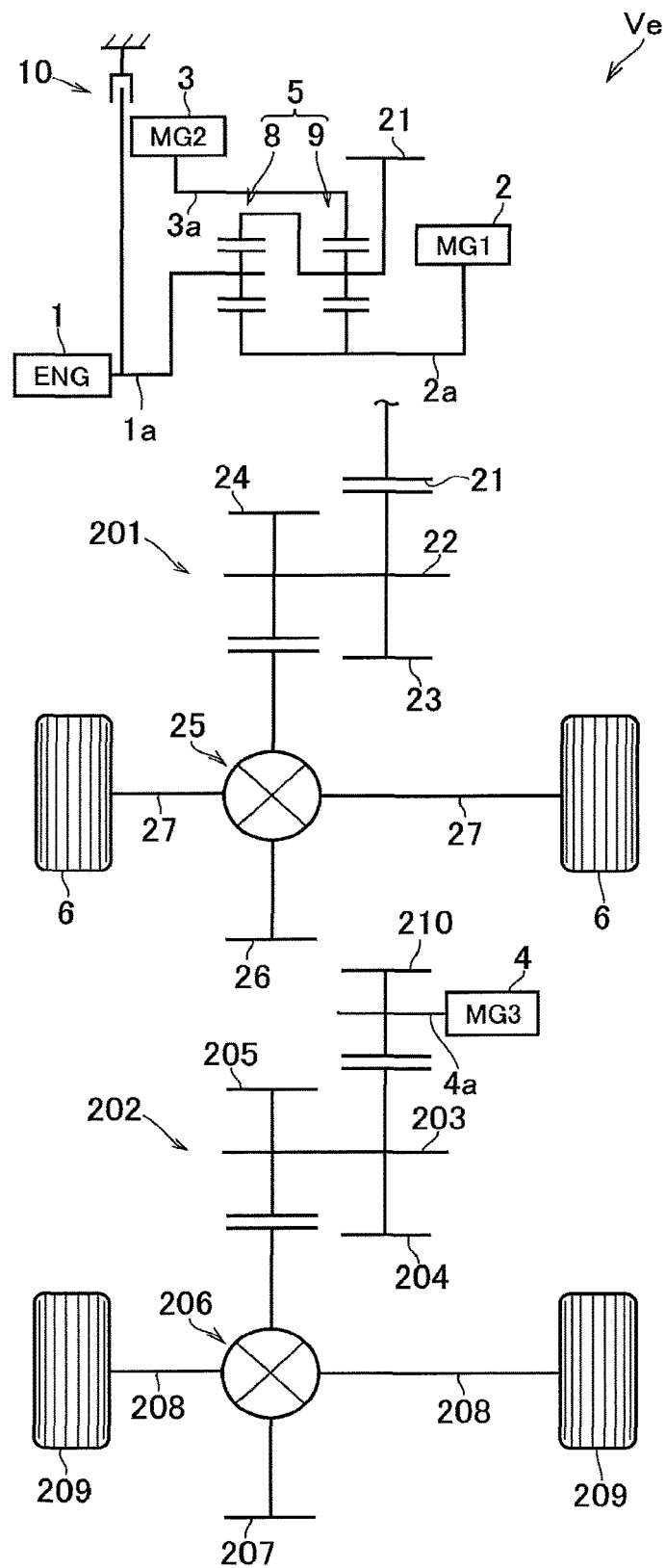
FIG. 19 is a schematic illustration showing a tenth example of the gear train of the hybrid vehicle.

FIG. 19 shows the tenth example of the gear train of the vehicle Ve in which the front wheels serve as the drive wheels 6. In the vehicle Ve shown in FIG. 19, the prime mover also includes the engine 1, the first motor 2, the second motor 3, and the third motor 4. The vehicle Ve shown in FIG. 18 further comprises a first output unit 201 and a second output unit 202.

The first output unit 201 includes the drive gear 21, the countershaft 22, the counter driven gear 23, the final drive gear 24, and the differential gear unit 25. The drive gear 21 is rotated integrally with the second carrier C2 of the differential mechanism 5. That is, the first output unit 201 is connected to the fourth rotary element 5*d* of the differential mechanism 5 to deliver power to the drive wheels 6. In the gear train shown in FIG. 19, the third motor 4 is not connected to the first output unit 201 but connected to the second output unit 202.

The second output unit 202 includes a countershaft 203, a counter driven gear 204, a final drive gear 205, and a differential gear unit 206. The counter driven gear 204 is fitted onto one of end portions of the countershaft 203 (i.e., in the right side in FIG. 19) and the final drive gear 205 is fitted onto the other end portion of the countershaft 203 (i.e., in the left side in FIG. 19) while being meshed with the final driven gear 207 of the differential gear unit 206. The differential gear unit 206 is connected to each of drive wheels 209 through each of driveshafts 208.

Torque of the third motor 4 may be applied to the drive wheels 209. To this end, the output shaft 4*a* of the third motor 4 is arranged parallel to the countershaft 203, and a pinion 210 is fitted onto a leading end (i.e., in the left side in FIG. 19) of the output shaft 4*a* while being meshed with the counter driven gear 204. That is, the third motor 4 is connected to the drive wheels 209 through the second output unit 202 so as to deliver torque to the drive wheels 209 through the driveshafts 208.

According to the embodiment of the present disclosure, the control system may also be applied to a vehicle in which the prime mover includes an engine and four motors.

Figure 20:
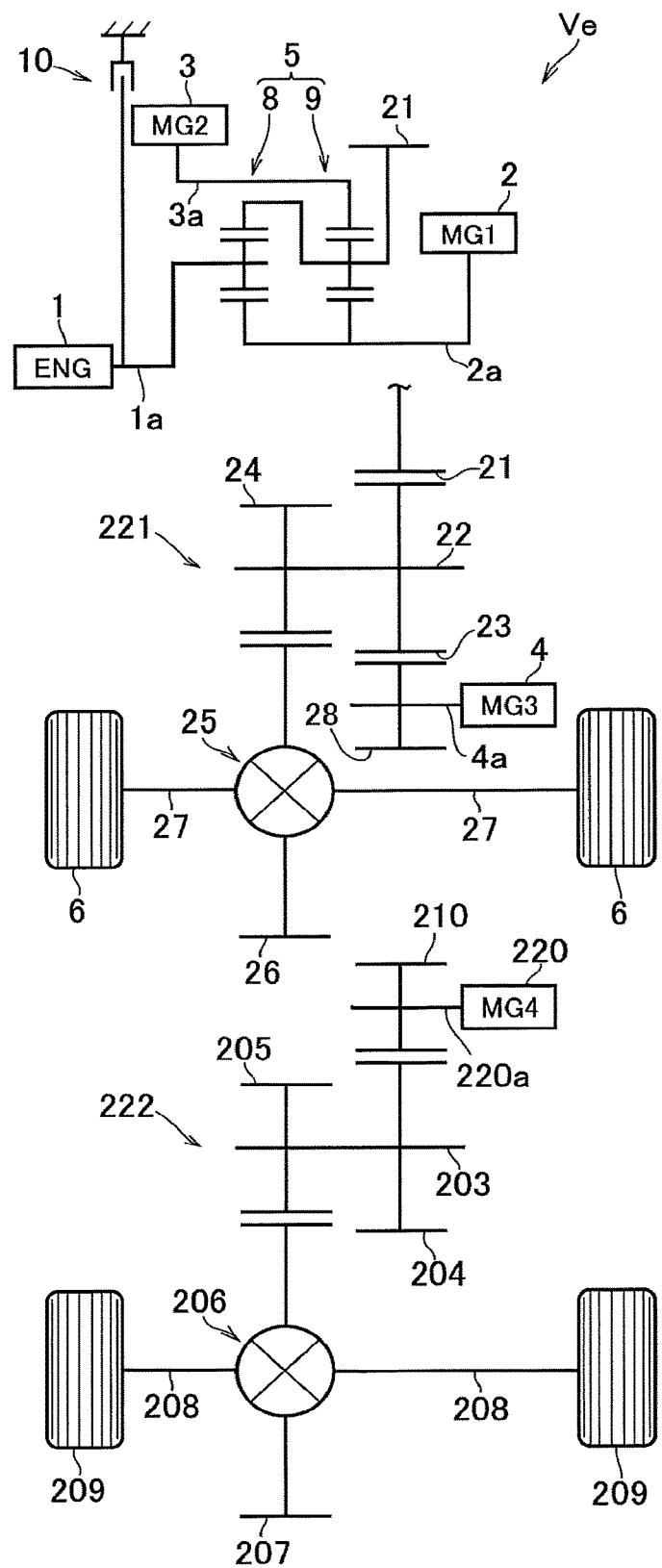
FIG. 20 is a schematic illustration showing an eleventh example of the gear train of the hybrid vehicle.

FIG. 20 shows the eleventh example of the gear train of the vehicle Ve. In the vehicle Ve shown in FIG. 20, the prime mover includes the engine 1, the first motor 2, the second motor 3, the third motor 4 and a fourth motor (referred to as "MG4" in FIG. 20) 220. The vehicle Ve shown in FIG. 18 further comprises a first output unit 221 and a second output unit 222.

A structure of the first output unit 221 is similar to that of the output unit 7. That is, the first output unit 221 is connected to the fourth rotary element 5*d* of the differential mechanism 5 to deliver power to the drive wheels 6. In the gear train shown in FIG. 20, the third motor 4 is connected to the first output unit 221 to deliver torque to the front wheels serving as the drive wheels 6.

A structure of the second output unit 222 is similar to that of the second output unit 202. The fourth motor 220 is connected to the second output unit 222 to deliver torque to the rear wheels serving as the drive wheels 209 through the driveshafts 208.

Although the above exemplary embodiment of the present disclosure has been described, it will be understood by those skilled in the art that the present application should not be limited to the described exemplary embodiment, and various changes and modifications can be made within the spirit and scope of the present disclosure.

What is claimed is:

1. A control system for a hybrid vehicle, comprising:
   a prime mover including an engine and at least three motors;
   a differential mechanism that performs a differential rotation among at least four rotary elements;
   an output unit that delivers power to drive wheels; and
   a controller that controls the prime mover,
   wherein the engine is connected to a first rotary element of the differential mechanism,
   a first motor of the prime mover is connected to a second rotary element of the differential mechanism,
   a second motor of the prime mover is connected to a third rotary element of the differential mechanism,
   the output unit is connected to a fourth rotary element of the differential mechanism,
   a third motor of the prime mover is connected to the output unit that is connected to the fourth rotary element or another output unit that is not connected to the fourth rotary element,
   the controller is configured to
   determine a running condition of the hybrid vehicle, and
   control the first motor and the second motor in such a manner as to establish reaction torques against torque of the engine, and control the third motor to generate drive torque to propel the hybrid vehicle in a reverse direction, when the engine is required to be activated to generate the drive torque to propel the hybrid vehicle during propulsion in the reverse direction.

2. The control system for a hybrid vehicle as claimed in claim 1, wherein the controller is further configured to switch a control mode based on at least any one of a vehicle speed and a required drive force during reverse propulsion, between:

a first control mode in which both of the first motor and the second motor are operated to establish the reaction torques against the engine torque, and the third motor is operated to generate the drive torque; and a second control mode in which any one of the first motor and the second motor is operated to establish the reaction torque against the engine torque, and the third motor is operated to generate the drive torque.

3. The control system for a hybrid vehicle as claimed in claim 2, wherein the controller is further configured to:
  compare the vehicle speed during reverse propulsion with a threshold speed;
  select the first control mode when the vehicle speed is lower than the threshold speed; and
  select the second control mode when the vehicle speed is higher than the threshold speed.

4. The control system for a hybrid vehicle as claimed in claim 2, wherein the controller is further configured to:
  compare the required drive force during reverse propulsion with a threshold value;
  select the first control mode when the required drive force is larger than the threshold value; and
  select the second control mode when the required drive force is smaller than the threshold value.

5. The control system for a hybrid vehicle as claimed in claim 2, wherein the controller is further configured to:
  compare the vehicle speed during reverse propulsion with a threshold speed;
  compare the required drive force during reverse propulsion with a threshold value;
  select the first control mode when the vehicle speed is lower than the threshold speed, and the required drive force is larger than the threshold value; and
  select the second control mode when the vehicle speed is higher than the threshold speed, or the required drive force is smaller than the threshold value.

6. The control system for a hybrid vehicle as claimed in claim 1,
  wherein the differential mechanism includes: a first planetary gear unit including a first sun gear, a first carrier, and a first ring gear; and a second planetary gear unit including a second sun gear, a second carrier, and a second ring gear,
  the first sun gear and the second sun gear are connected to each other,
  the first ring gear and the second carrier are connected to each other,
  the first carrier is connected to the engine to serve as the first rotary element,
  the first sun gear or the second sun gear is connected to the first motor to serve as the second rotary element,
  the second ring gear is connected to the second motor to serve as the third rotary element, and
  the first ring gear or the second carrier is connected to the output unit to serve as the fourth rotary element.

7. The control system for a hybrid vehicle as claimed in claim 1,
  wherein the differential mechanism includes: a first planetary gear unit including a first sun gear, a first carrier, and a first ring gear; and a second planetary gear unit including a second sun gear, a second carrier, and a second ring gear,
  the first carrier and the second ring gear are connected to each other,
  the first ring gear and the second carrier are connected to each other,
  the first ring gear or the second carrier is connected to the engine to serve as the first rotary element,
  the second sun gear is connected to the first motor to serve as the second rotary element,
  the first sun gear is connected to the second motor to serve as the third rotary element, and
  the first carrier or the second ring gear is connected to the output unit to serve as the fourth rotary element.

* * * * *